US009827855B2

(12) United States Patent
Iida et al.

(10) Patent No.: US 9,827,855 B2
(45) Date of Patent: Nov. 28, 2017

(54) VEHICLE BRAKE SYSTEM

(71) Applicant: ADVICS CO., LTD., Kariya-shi, Aichi-ken (JP)

(72) Inventors: Takanori Iida, Chiryu (JP); Takuji Ishimoto, Okazaki (JP)

(73) Assignee: ADVICS CO., LTD., Kariya-shi, Aichi-ken (JP)

( * ) Notice: Subject to any disclaimer, the term of this patent is extended or adjusted under 35 U.S.C. 154(b) by 22 days.

(21) Appl. No.: 14/908,881

(22) PCT Filed: Jul. 30, 2014

(86) PCT No.: PCT/JP2014/070104
§ 371 (c)(1),
(2) Date: Jan. 29, 2016

(87) PCT Pub. No.: WO2015/016278
PCT Pub. Date: Feb. 5, 2015

(65) Prior Publication Data
US 2016/0159224 A1 Jun. 9, 2016

(30) Foreign Application Priority Data

Jul. 30, 2013 (JP) .................................. 2013-157812

(51) Int. Cl.
*B60T 13/00* (2006.01)
*B60L 7/26* (2006.01)
(Continued)

(52) U.S. Cl.
CPC ....... *B60L 7/26* (2013.01); *B60L 7/14* (2013.01); *B60L 11/123* (2013.01); *B60L 11/14* (2013.01);
(Continued)

(58) Field of Classification Search
CPC ...... B60T 8/5006; B60T 8/5012; B60T 8/441; B60T 8/442; B60T 8/50; B60T 2270/604; B60L 7/26; B60L 15/2009
See application file for complete search history.

(56) References Cited

U.S. PATENT DOCUMENTS 8,303,046 B2 * 11/2012 Nakata .................. B60K 6/445
188/1.11 E
9,387,765 B2 * 7/2016 Naito ........................ B60T 1/10
(Continued)

FOREIGN PATENT DOCUMENTS

| JP | 2006-096218 A | 4/2006 |
|---|---|---|
| JP | 2010-047084 A | 3/2010 |
| JP | 2012-001195 A | 1/2012 |

OTHER PUBLICATIONS

International Search Report (PCT/ISA/210) dated Oct. 7, 2014, by the Japanese Patent Office as the International Searching Authority for International Application No. PCT/JP2014/070104.
(Continued)

*Primary Examiner* — Nicholas J Lane
(74) *Attorney, Agent, or Firm* — Buchanan Ingersoll & Rooney PC

(57) ABSTRACT

A control device, when performing a reallocation control, makes the decrease gradient of regeneration braking force in a first period in which the amount of decrease in a basal fluid pressure from a reference basal fluid pressure is less than a specified amount of decrease greater than the decrease gradient of the regeneration braking force in a second period in which the amount of decrease in the basal fluid pressure is not less than the specified amount of decrease.

6 Claims, 13 Drawing Sheets

(51) Int. Cl.
- *B60T 1/10* (2006.01)
- *B60T 7/04* (2006.01)
- *B60T 13/16* (2006.01)
- *B60L 7/14* (2006.01)
- *B60L 11/12* (2006.01)
- *B60L 11/14* (2006.01)
- *B60L 11/18* (2006.01)
- *B60L 15/20* (2006.01)
- *B60T 13/14* (2006.01)
- *B60T 13/68* (2006.01)

(52) U.S. Cl.
CPC ....... *B60L 11/1861* (2013.01); *B60L 15/2009* (2013.01); *B60T 1/10* (2013.01); *B60T 7/042* (2013.01); *B60T 13/143* (2013.01); *B60T 13/146* (2013.01); *B60T 13/166* (2013.01); *B60T 13/686* (2013.01); *B60L 2210/40* (2013.01); *B60L 2240/421* (2013.01); *B60L 2240/80* (2013.01); *B60L 2250/26* (2013.01); *Y02T 10/6217* (2013.01); *Y02T 10/645* (2013.01); *Y02T 10/7005* (2013.01); *Y02T 10/705* (2013.01); *Y02T 10/7044* (2013.01); *Y02T 10/7077* (2013.01); *Y02T 10/7241* (2013.01); *Y02T 10/7275* (2013.01)

(56) References Cited

U.S. PATENT DOCUMENTS

| 2005/0269875 | A1  | 12/2005 | Maki et al. |
| 2010/0089709 | A1* | 4/2010  | Shimada ............... B60T 1/10 188/159 |
| 2011/0066345 | A1* | 3/2011  | Nasu .................. B60L 7/24 701/70 |
| 2012/0038208 | A1* | 2/2012  | Matsushita ........... B60L 7/18 303/3 |
| 2014/0084673 | A1* | 3/2014  | Matsuoka ........... B60T 8/4872 303/3 |
| 2015/0202965 | A1* | 7/2015  | Gabor ................ B60L 7/18 701/70 |
| 2016/0039292 | A1* | 2/2016  | Takahashi ........... B60W 10/08 701/70 |

OTHER PUBLICATIONS

Written Opinion (PCT/ISA/237) dated Oct. 7, 2014, by the Japanese Patent Office as the International Searching Authority for International Application No. PCT/JP2014/070104.

* cited by examiner

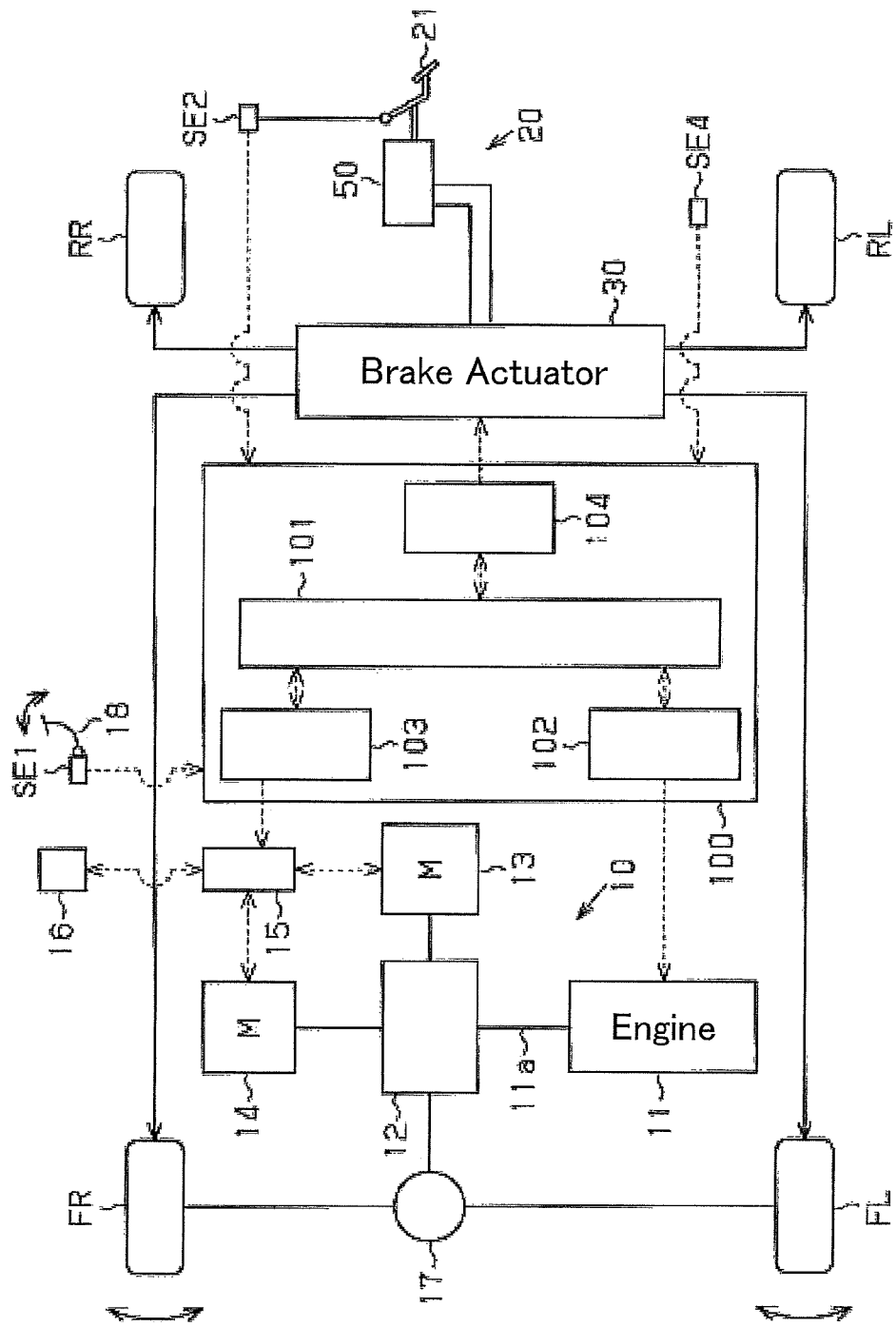
[FIG.1]

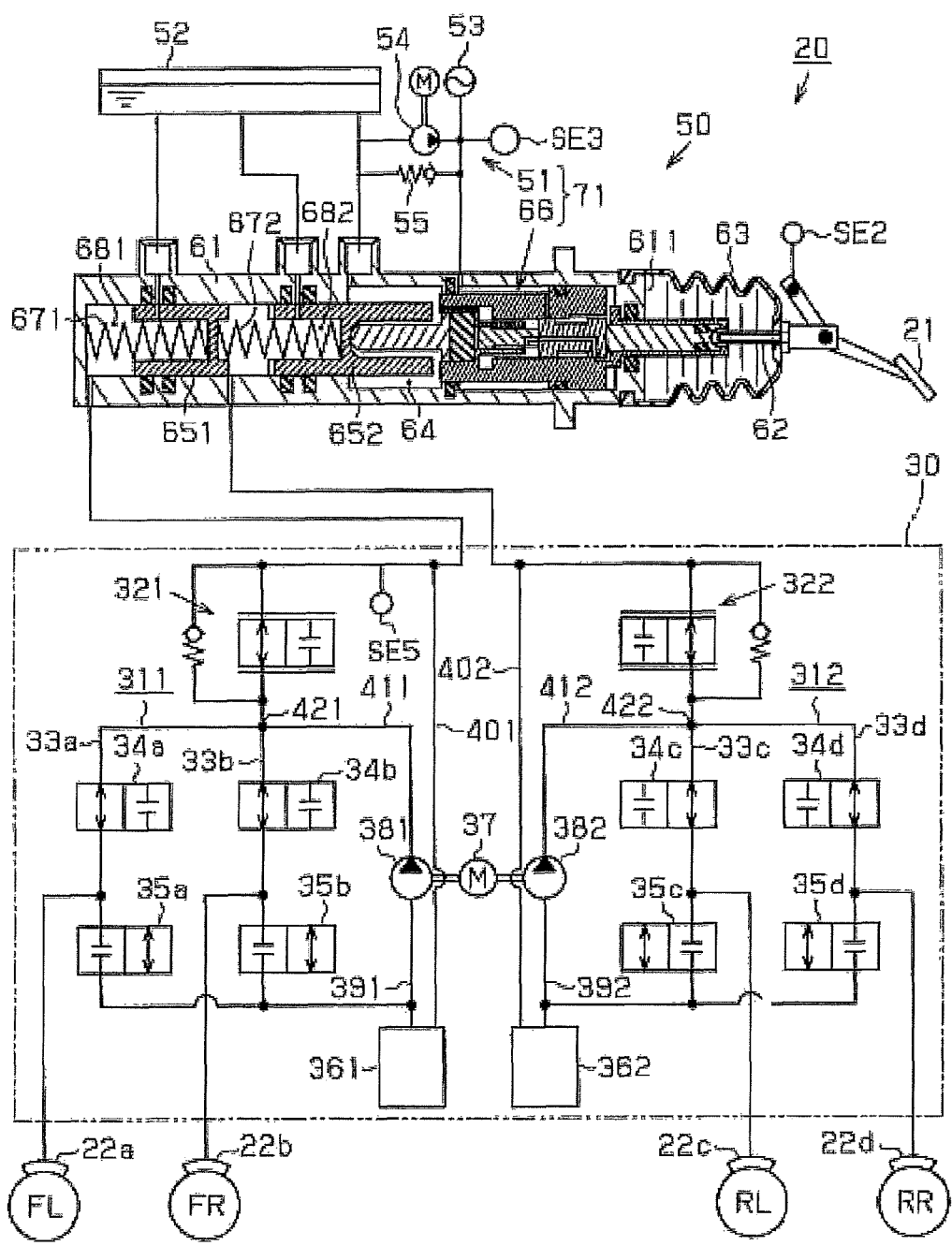
[FIG.2]

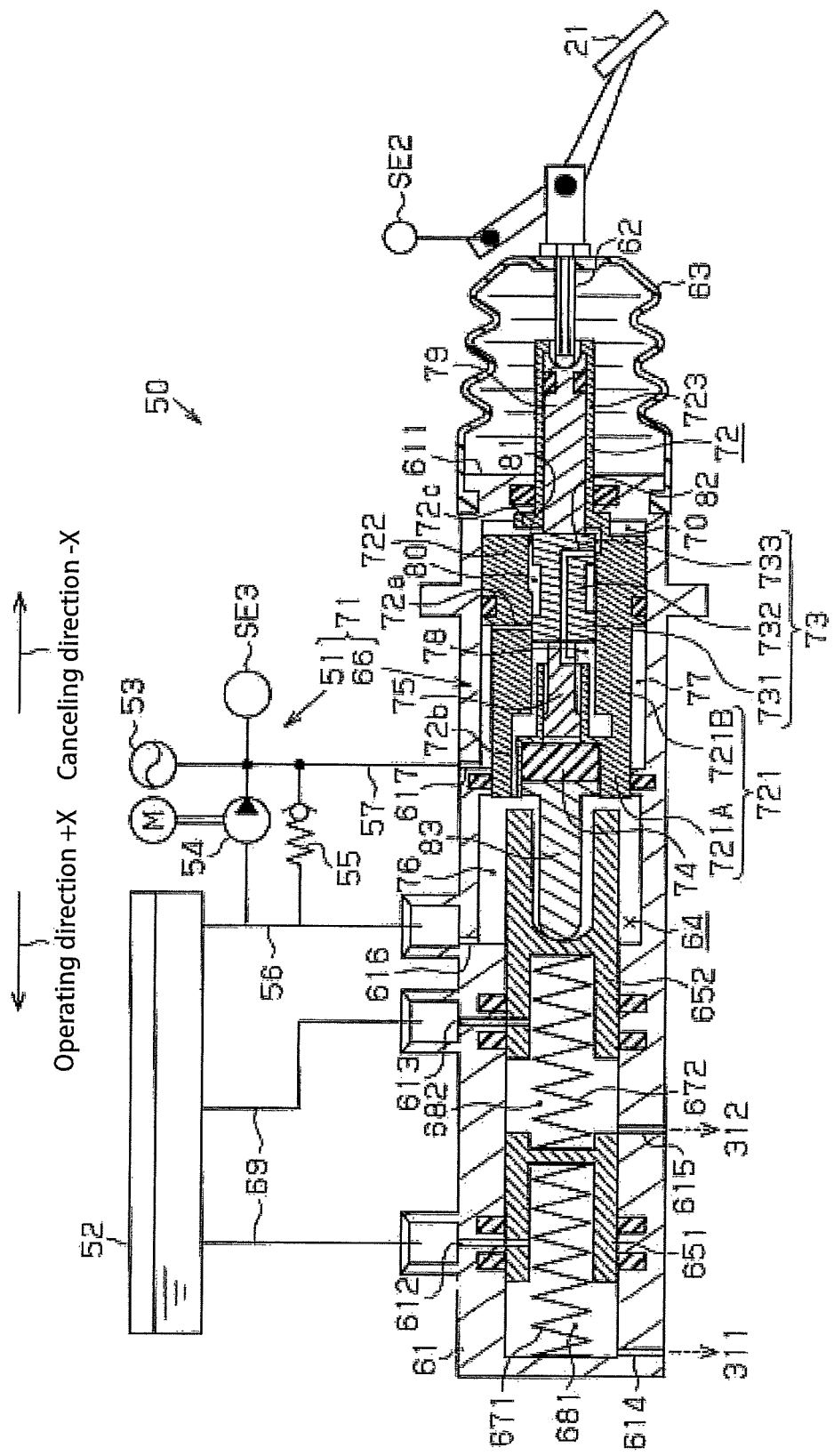
[FIG.3]

[FIG.4]
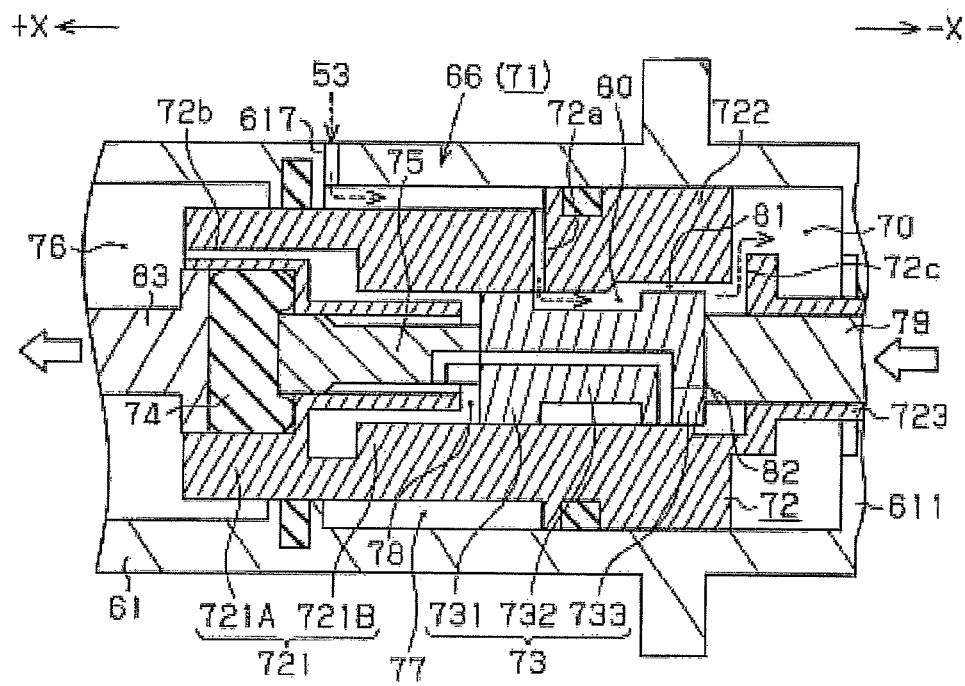
[FIG.5]
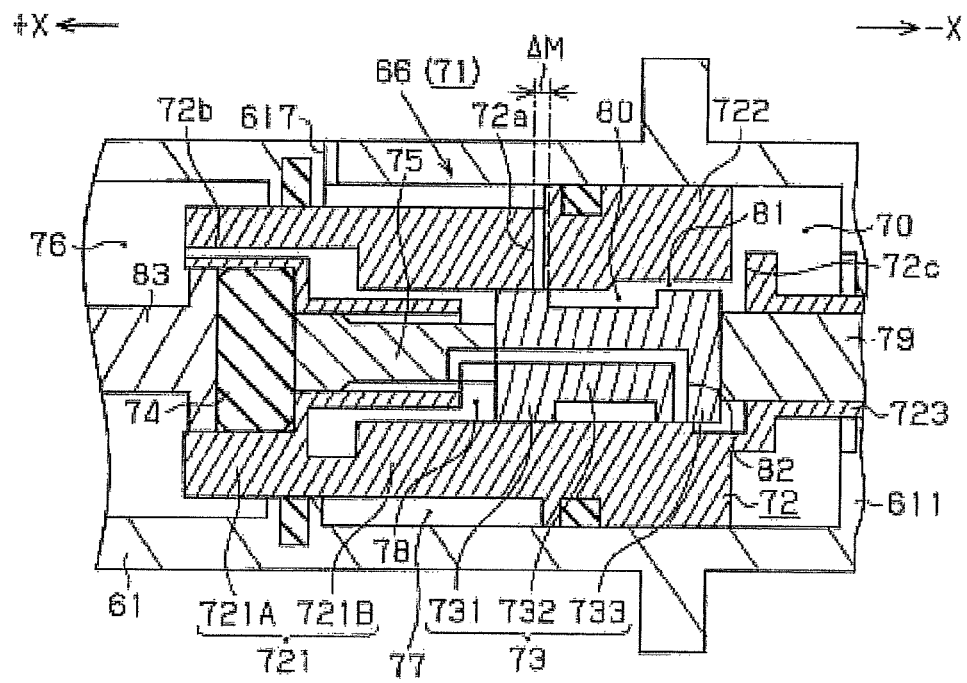

[FIG.6]
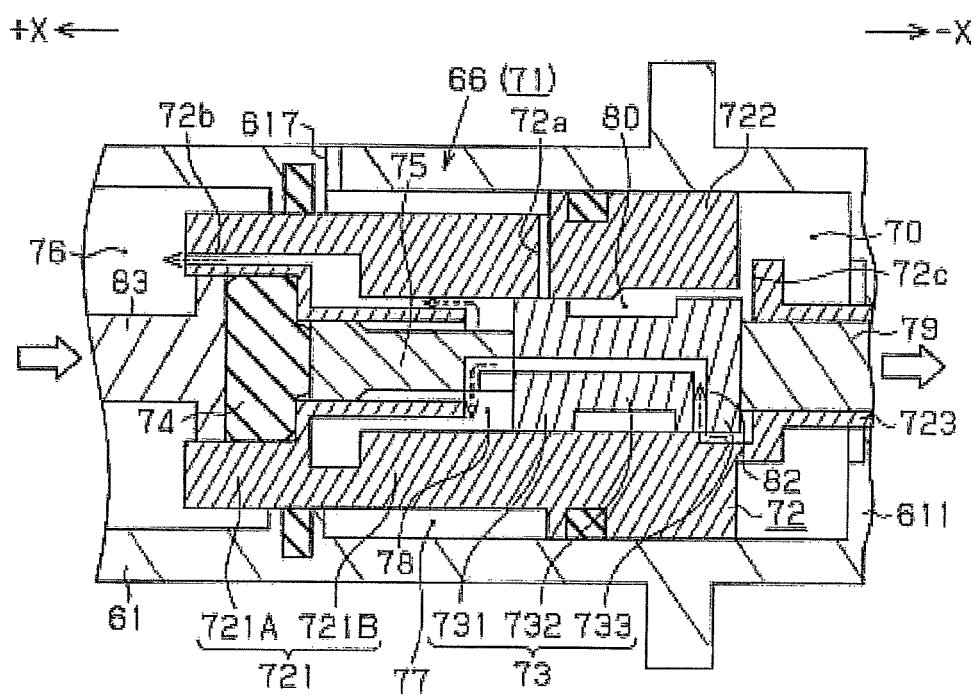

[FIG.9]
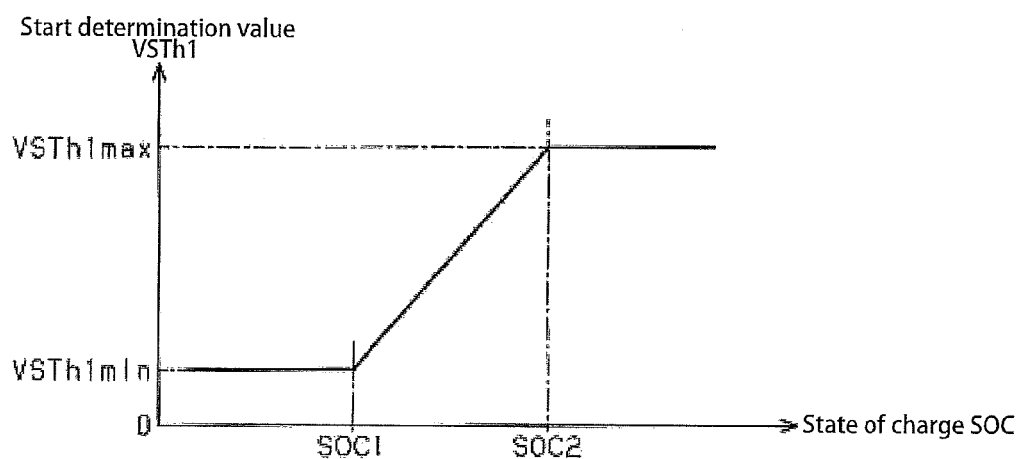

[FIG.10A]
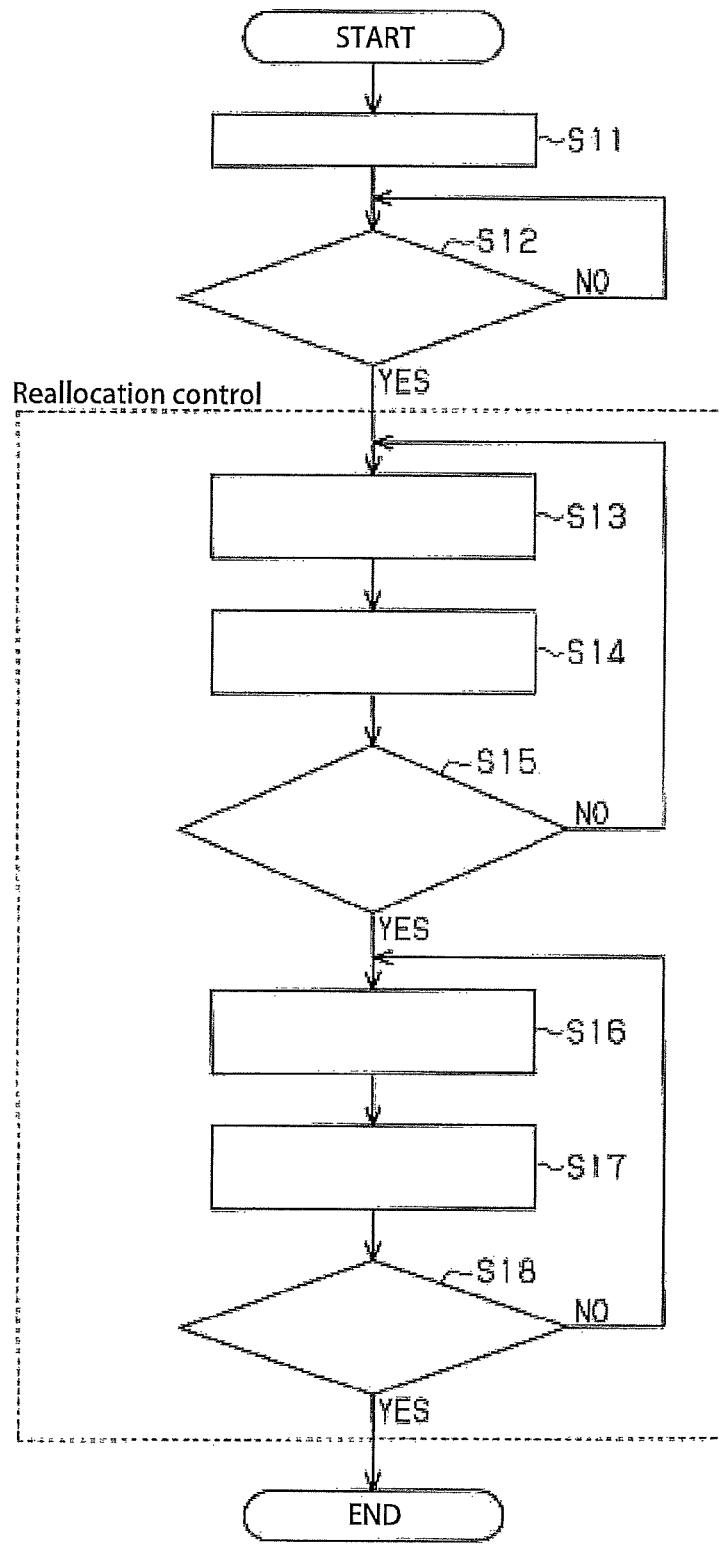

[FIG.10B]

S11　Determine start determination value VSTh1

S12　Vehicle body speed VS ≤ VSTh1?

S13　Decrease gradient of regeneration braking force BPR ← first decrease gradient $\Delta DWN1$ S14　Increase gradient of hydraulic braking force BPP ← first increase gradient $\Delta UP1$ S15　Depressurization amount $\Delta Pmc$ ≥ Specified depressurization amount $\Delta PmcTh$?

S16　Decrease gradient of regeneration braking force BPR ← second decrease gradient $\Delta DWN2$ S17　Increase gradient of hydraulic braking force BPP ← second increase gradient $\Delta UP2$ S18　VS ≤ End determination value VSTh2?

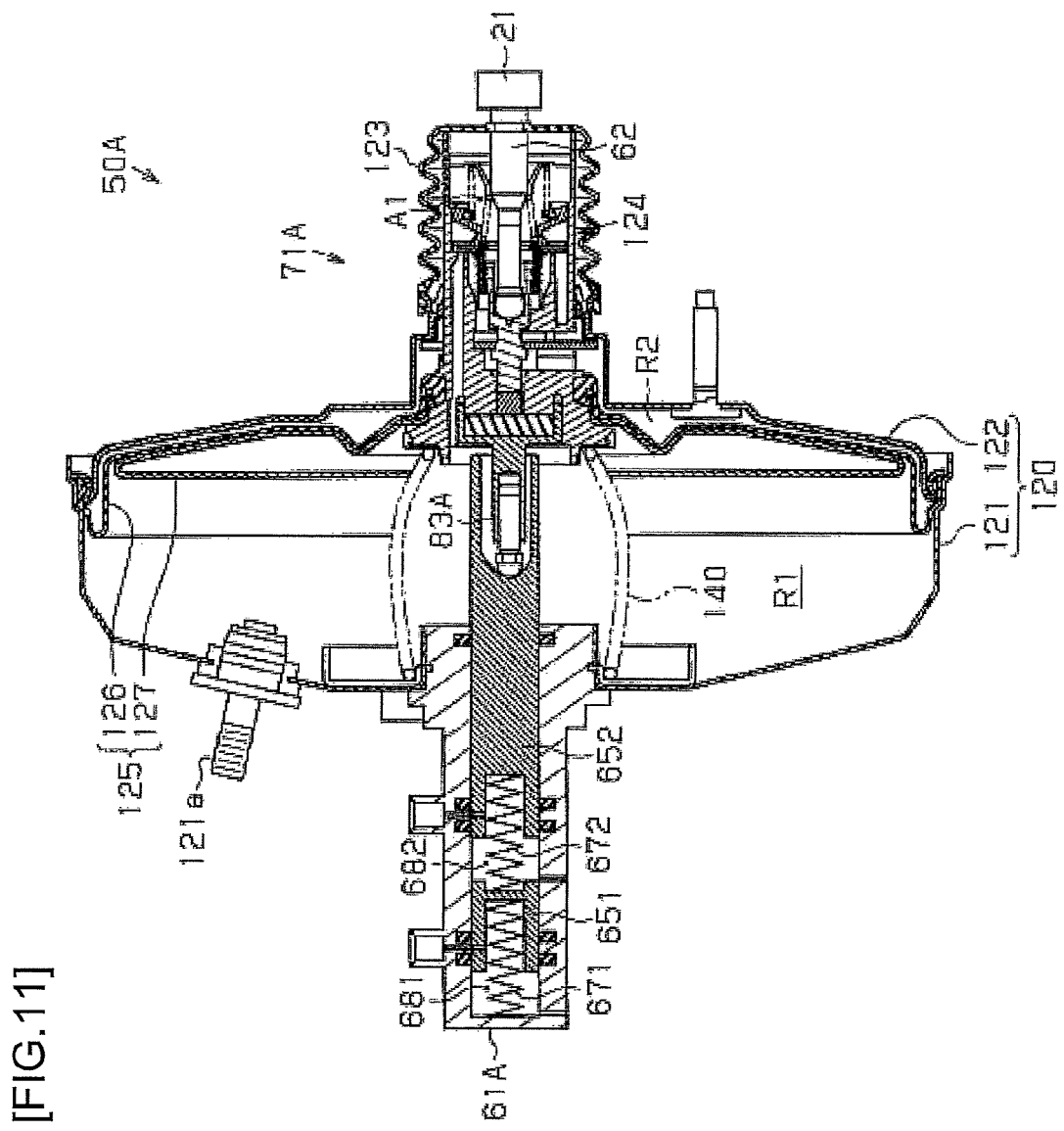
[FIG.11]

[FIG.12]
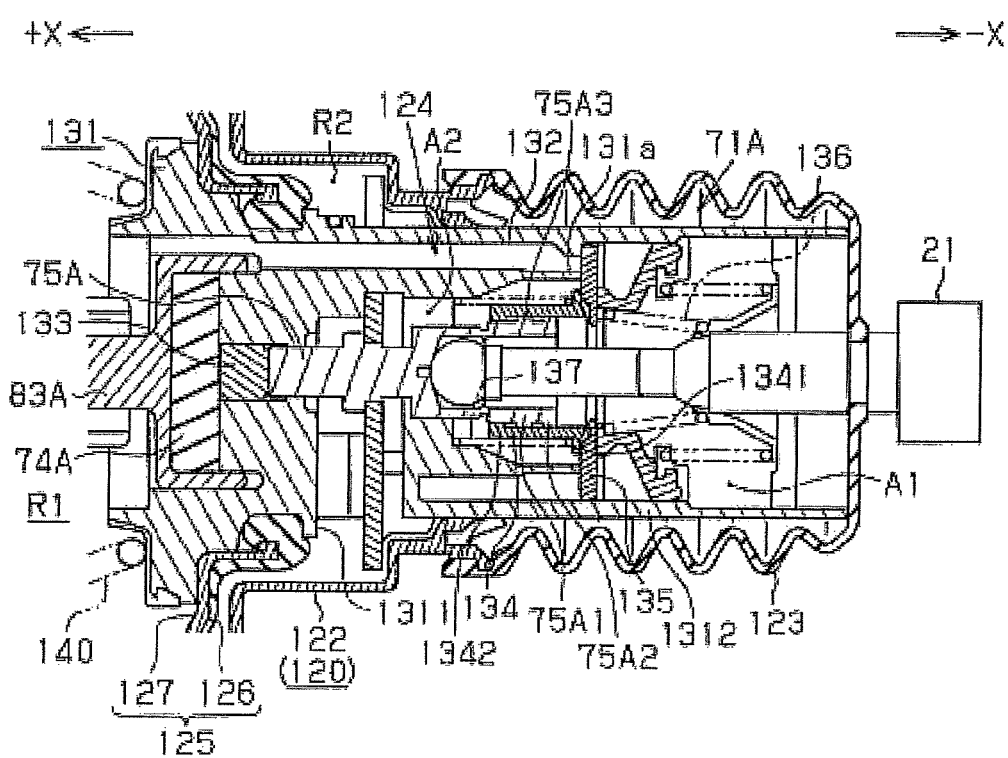

[FIG.13]
| State of charge SOC | Reference start determination value VSTh1B |
|---|---|
| SOC<KSOC | VSTh1B1 |
| SOC≥KSOC | VSTh1B2 (>VSTh1B1) |
[FIG.14]
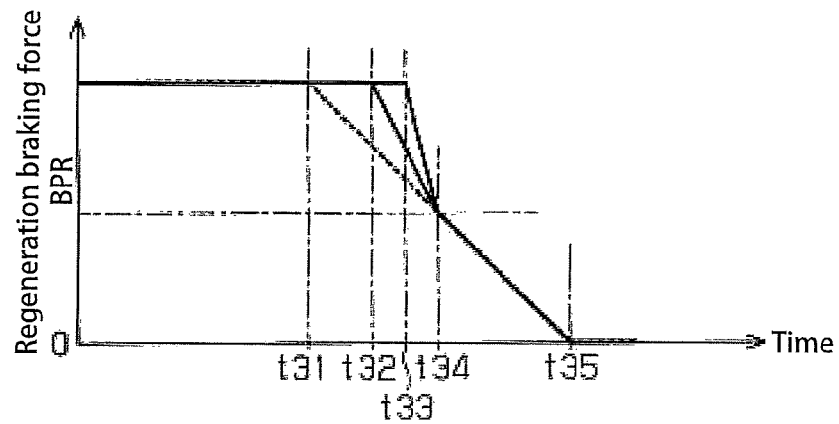
[FIG.15]
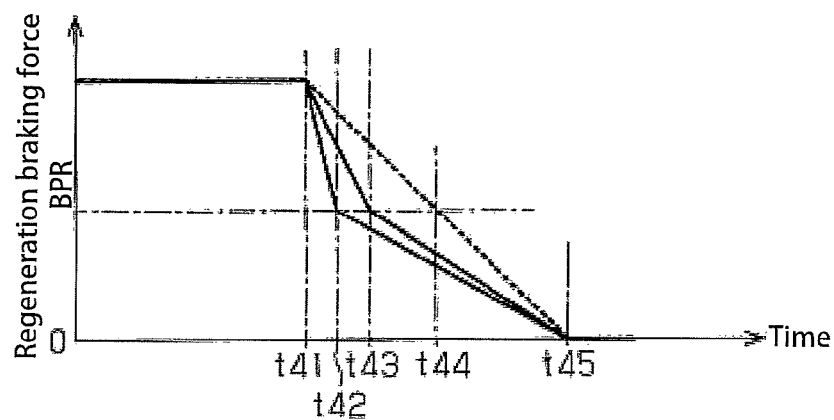

VEHICLE BRAKE SYSTEM

TECHNICAL FIELD

The present invention relates to a vehicle brake system including a regeneration brake device and a hydraulic brake device.

BACKGROUND ART

Patent Literature 1 discloses an exemplary hydraulic brake device configured to control vehicle braking force in cooperation with a regeneration brake device. This device includes a fluid pressure generator configured to generate, in a master cylinder, a basal fluid pressure as a fluid pressure corresponding to driver's brake operation, and a brake actuator configured to adjust a differential pressure between the master cylinder and a wheel cylinder provided for a wheel.

The fluid pressure generator includes the master cylinder as well as a booster device configured to assist driver's brake operation force. In the master cylinder, the basal fluid pressure is not increased until a shift amount of a master piston configured to shift in accordance with brake operation force assisted by the booster device reaches a predetermined amount. When the brake operation force increases and the shift amount of the master piston reaches or exceeds the predetermined amount, the basal fluid pressure is increased in accordance with the difference obtained by subtracting the predetermined amount from the shift amount and the wheel cylinder is supplied with an amount, corresponding to the basal fluid pressure, of brake fluid via the brake actuator. The "shift amount of the master piston" herein indicates the amount of shift from an initial position of the master piston while a brake is not operated.

In such a hydraulic brake device, the brake actuator is actuated to apply, to a vehicle, braking force corresponding to a difference obtained by subtracting regeneration braking force applied from the regeneration brake device to the vehicle from required braking force corresponding to a driver's brake operation amount. Braking force applied from the hydraulic brake device to a vehicle will be referred to as "hydraulic braking force".

Regeneration braking force applied from the regeneration brake device to the vehicle is harder to control than hydraulic braking force applied from the hydraulic brake device to the vehicle. Driver's brake operation thus reduces vehicle body speed. When the vehicle body speed becomes not more than predetermined speed, the regeneration braking force is gradually decreased and the hydraulic braking force is gradually increased in accordance with the reduction in vehicle body speed. Such control is a so-called reallocation control. By the reallocation control, the regeneration braking force becomes "zero (0)" and the hydraulic braking force becomes equal to the required braking force corresponding to the driver's brake operation before the vehicle stops.

CITATIONS LIST

Patent Literature

Patent Literature 1: JP 2006-96218 A

SUMMARY OF INVENTION

Technical Problems

When the hydraulic braking force is increased to compensate for the decreased regeneration braking force in the reallocation control, the brake actuator is actuated to gradually increase the differential pressure between the master cylinder and the wheel cylinder. In this case, brake fluid in the master cylinder is drawn by a pump included in the brake actuator and is supplied into the wheel cylinder. Decrease in brake fluid in the master cylinder then causes decrease in basal fluid pressure, and the master piston becomes likely to shift in a direction of increasing the basal fluid pressure (hereinafter, also referred to as an "operating direction"). Brake operation force assisted by the booster device is applied to the master piston in this case. Accordingly, the master piston is shifted in the operating direction to displace a brake operating member that is coupled to be driven by the master piston. Even if a driver does not increase the brake operation force, the brake operating member will be displaced to cause deterioration in drivability.

According to one possible method, deterioration in drivability during the reallocation control can be restrained by reducing a decrease gradient of the regeneration braking force or an increase gradient of the hydraulic braking force so as to have a gentle gradient. This method reduces decreasing speed of the brake fluid in the master cylinder and can thus reduce speed of displacement of the brake operating member due to decrease in basal fluid pressure so as to restrain deterioration in drivability. However, it is necessary in this case to increase the predetermined speed for determination of a start time point of reallocation control. Such increase in predetermined speed causes deterioration in regeneration efficiency.

It is an object of the present invention to provide a vehicle brake system configured to restrain deterioration in drivability as well as deterioration in regeneration efficiency when performing reallocation control of gradually decreasing regeneration braking force and gradually increasing hydraulic braking force in accordance with vehicle speed reduction during brake operation.

Solutions to Problems

In order to achieve the object mentioned above, a vehicle brake system is assumed to include: a regeneration brake device configured to apply regeneration braking force to a vehicle; and a hydraulic brake device configured to adjust a fluid pressure in a wheel cylinder corresponding to a wheel to apply hydraulic braking force to the vehicle; and be configured to perform reallocation control of gradually decreasing the regeneration braking force and gradually increasing the hydraulic braking force in accordance with reduction in vehicle speed during brake operation of operating a brake operating member. In this system, the hydraulic brake device includes a fluid pressure generator configured to generate a basal fluid pressure corresponding to the brake operation in a master cylinder, and a brake actuator configured to adjust a differential pressure between the master cylinder and the wheel cylinder. The brake actuator includes a differential pressure control valve disposed at a channel between the master cylinder and the wheel cylinder, and a feed pump configured to draw brake fluid out of the master cylinder and discharge the brake fluid to a channel located closer to the wheel cylinder than the differential pressure control valve. The fluid pressure generator includes a booster device configured to further largely assist operation force of the brake operating member as the fluid pressure in a booster chamber is higher, and the fluid pressure generator is configured to adjust the basal fluid pressure by shifting a master piston in the master cylinder in accordance with the operation force assisted by the booster device and supply to the wheel cylinder an amount, corresponding to the basal fluid pressure, of the brake fluid. Assuming that the basal fluid pressure at start timing of a keeping state, where an operation amount of the brake operating member is kept, is a reference basal fluid pressure, the booster device includes a valve device configured to regulate inflow of fluid to the booster chamber if an amount of decrease of the basal fluid pressure from the reference basal fluid pressure is less than a specified amount of decrease even when the feed pump is actuated to decrease the brake fluid in the master cylinder in the keeping state. The vehicle system further includes a control device configured to make a decrease gradient of regeneration braking force in a first period, in which the amount of decrease of the basal fluid pressure from the reference basal fluid pressure is less than the specified amount of decrease, greater than a decrease gradient of regeneration braking force in a second period, in which the amount of decrease of the basal fluid pressure is not less than the specified amount of decrease, during the reallocation control in the keeping state.

This configuration causes reallocation control to start when driver's operation to the brake operating member, or brake operation, reduces vehicle body speed. When the reallocation control starts, the regeneration braking force is gradually decreased and the hydraulic braking force is gradually increased in accordance with vehicle speed reduction. In order to increase the hydraulic braking force, at least a pump, out of the differential pressure control valve and the pump included in the brake actuator, operates to increase the differential pressure between the master cylinder and the wheel cylinder.

The brake fluid in the master cylinder is drawn by the pump in operation and thus decreases. The master piston in the master cylinder accordingly becomes likely to shift in the direction of increasing the basal fluid pressure or the fluid pressure in the master cylinder. The valve device in the booster device regulates inflow of fluid to the booster chamber in the first period in which the amount of decrease in basal fluid pressure from the reference basal fluid pressure is less than the specified amount of decrease. Specifically, the booster device does not have higher assist efficiency for operation force of the brake operating member, and the brake operating member is unlikely to be displaced in the direction of increasing the brake operation amount. Accordingly, even if the master piston becomes likely to shift due to decrease in basal fluid pressure in the first period, the brake operating member is unlikely to be displaced and drivability is unlikely to deteriorate.

However, in the second period in which the amount of decrease in basal fluid pressure from the reference basal fluid pressure is not less than the specified amount of decrease, the valve device allows inflow of fluid to the booster chamber so that the booster device accordingly has higher assist efficiency for operation force of the brake operating member. The brake operating member is more likely to be displaced in the direction of increasing the brake operation amount in the second period than the first period. Accordingly, speed of displacement of the brake operating member is likely to increase as speed of decrease in basal fluid pressure is higher in the second period. This will lead to deterioration in drivability.

The above configuration causes the decrease gradient of the regeneration braking force in the first period to be greater than the decrease gradient of the regeneration braking force in the second period in the reallocation control. Specifically, the regeneration braking force is largely decreased and the hydraulic braking force is largely increased in the first period in which the brake operating member can be kept unlikely to be displaced despite decrease in basal fluid pressure. Without increasing the decrease gradient of the regeneration braking force in the second period in which the brake operating member becomes likely to be displaced due to decrease in basal fluid pressure, it is possible to delay a start time point of the reallocation control. This achieves restraint of deterioration in drivability as well as deterioration in regeneration efficiency upon reallocation control during brake operation.

The reallocation control is configured to start when vehicle body speed decreases to reallocation start speed and end before the vehicle body speed reaches reallocation end speed lower than the reallocation start speed. The vehicle system can further include a battery configured to store electric power generated when the regeneration brake device applies regeneration braking force to the vehicle. In a low state of charge of the battery, the battery can be efficiently charged by increasing the regeneration braking force applied from the regeneration brake device to the vehicle during vehicle braking. Improvement in battery charging efficiency is preferably achieved by reducing the reallocation start speed and delaying the start time point of the reallocation control. In contrast, in a high state of charge of the battery, even if the regeneration brake device increases an electric power generation amount, part of the electric power may not be stored in the battery but can be discharged.

In the vehicle system, the control device preferably performs, as the reallocation control, when a state of charge of the battery is less than a predetermined amount, first reallocation control of making the reallocation start speed lower than that of a case where the state of charge is not less than the predetermined amount and increasing the decrease gradient of the regeneration braking force in the first period as the state of charge is lower. Meanwhile, the control device preferably performs, as the reallocation control, when the state of charge of the battery is not less than the predetermined amount, second reallocation control of setting the reallocation start speed to a fixed value, increasing the decrease gradient of the regeneration braking force in the first period as the state of charge is higher, and decreasing the decrease gradient of the regeneration braking force in the second period as the state of charge is higher.

This configuration enables determination that the state of charge of the battery is low if the state of charge of the battery is less than the predetermined amount. The reallocation start speed is thus made lower than that of the case where the state of charge is not less than the predetermined amount (the first reallocation control). This achieves delay of the start time point of the reallocation control of the case where the state of charge of the battery is less than the predetermined amount in comparison to the reallocation control of the case where the state of charge is not less than the predetermined amount. Even with such delay of the start time point of the reallocation control, the decrease gradient of the regeneration braking force can be kept small in the second period by increasing the decrease gradient of the regeneration braking force in the first period. In the case where the state of charge of the battery is less than the predetermined amount, the battery can be charged efficiently during vehicle braking with restrained deterioration in drivability.

In the other case where the state of charge of the battery is not less than the predetermined amount, the state of charge of the battery can be determined as being high. The reallocation start speed can be made equal to the fixed value. As the state of charge is higher, the decrease gradient of the regeneration braking force in the first period is made greater and the decrease gradient of the regeneration braking force in the second period is made smaller (the second reallocation control). The decrease gradient of the regeneration braking force in the second period can thus be made smaller with no change in start time point of the reallocation control when the state of charge is not less than the predetermined amount. In other words, it is possible to reduce the speed of decrease in basal fluid pressure in the second period. Even if the brake operating member is displaced in the second period, the speed of displacement thereof can be reduced. A driver operating the brake operating member is thus unlikely to sense the displacement of the brake operating member. In the case where the state of charge of the battery is not less than the predetermined amount, deterioration in drivability can be restrained more effectively as the state of charge is higher.

The above configuration enables the first reallocation control or the second reallocation control to be selectively performed depending on whether or not the state of charge of the battery is not less than the predetermined amount.

In the vehicle system, the control device preferably performs the reallocation control of reducing the reallocation start speed and increasing the decrease gradient of the regeneration braking force in the first period as the state of charge of the battery is lower. This configuration allows the reallocation start speed to be reduced as the state of charge is higher and the start time point of the reallocation control can thus be delayed regardless of whether or not the state of charge is not less than the predetermined amount. The decrease gradient of the regeneration braking force in the first period is made greater as the reallocation start speed is lower, in other words, the state of charge is lower. Even if the reallocation start speed and the decrease gradient of the regeneration braking force in the first period are changed in accordance with the state of charge, the decrease gradient of the regeneration braking force in the second period is not changed. As the state of charge is lower, the battery can be charged more efficiently as well as deterioration in drivability is restrained.

The control device preferably performs the reallocation control of setting the reallocation start speed to a fixed value, increasing the decrease gradient of the regeneration braking force in the first period and decreasing the decrease gradient of the regeneration braking force in the second period as the state of charge of the battery is higher. This configuration enables the decrease gradient of the regeneration braking force in the second period to be made smaller while the reallocation start speed has the fixed value, in other words, while the start time point of the reallocation control is fixed, regardless of whether or not the state of charge is not less than the predetermined amount. Accordingly, deterioration in drivability can be restrained more effectively as the state of charge is higher.

The control device preferably performs the reallocation control by increasing the reallocation start speed and decreasing the decrease gradient of the regeneration braking force in the second period as the state of charge of the battery is higher. This configuration achieves delay of the start time point of the reallocation control by reducing the reallocation start speed when the state of charge of the battery is low. Accordingly, the regeneration brake device can generate more electric power during brake operation and the battery can be charged efficiently during vehicle braking.

Moreover, the decrease gradient of the regeneration braking force in the second period is made smaller while the start time point of the reallocation control is delayed. In other words, the speed of decrease in basal fluid pressure in the second period is reduced. Even if the brake operating member is displaced in the second period, the speed of displacement thereof can be reduced. A driver operating the brake operating member is thus unlikely to sense the displacement of the brake operating member. Accordingly, deterioration in drivability can be further restrained during the reallocation control.

In the vehicle brake system, the decrease gradient of the regeneration braking force in the first period can have a first constant value and the decrease gradient of the regeneration braking force in the second period can have a second constant value smaller than the first constant value. This configuration can change the decrease gradient of the regeneration braking force during the reallocation control in two phases.

BRIEF DESCRIPTION OF DRAWINGS

FIG. 1 is a schematic diagram of a hybrid vehicle including a vehicle brake system according to a first embodiment.

FIG. 2 is a diagram of a schematic configuration of a hydraulic brake device included in the vehicle brake system according to the first embodiment.

FIG. 3 is a sectional view of a schematic configuration of a basal fluid pressure supply device.

FIG. 4 is a sectional view of a valve device in a case where a brake operation amount is increasing.

FIG. 5 is a sectional view of the valve device in a case where the brake operation amount is kept constant.

FIG. 6 is a sectional view of the valve device in a case where the brake operation amount is decreasing.

FIG. 9 is a map for determination of a start determination value according to a state of charge of a battery.

FIG. 10A is an explanatory flowchart on processing routine executed for reallocation control by a control device of the brake system.

FIG. 10B is a caption of FIG. 10A.

FIG. 11 is a sectional view of a schematic configuration of a basal fluid pressure supply device included in a vehicle brake system according to a second embodiment.

FIG. 12 is a sectional view of a schematic configuration of a booster device included in the vehicle brake system according to the second embodiment.

FIG. 13 is a map for determination of a reference start determination value according to a state of charge of a battery in a vehicle brake system according to a third embodiment.

FIG. 14 is a timing chart indicating a state of decrease in regeneration braking force in a case where first reallocation control is performed in the vehicle brake system according to the third embodiment.

FIG. 15 is a timing chart indicating a state of decrease in regeneration braking force in a case where second reallocation control is performed in the vehicle brake system according to the third embodiment.

DESCRIPTION OF EMBODIMENTS

First Embodiment

Figure 7A:
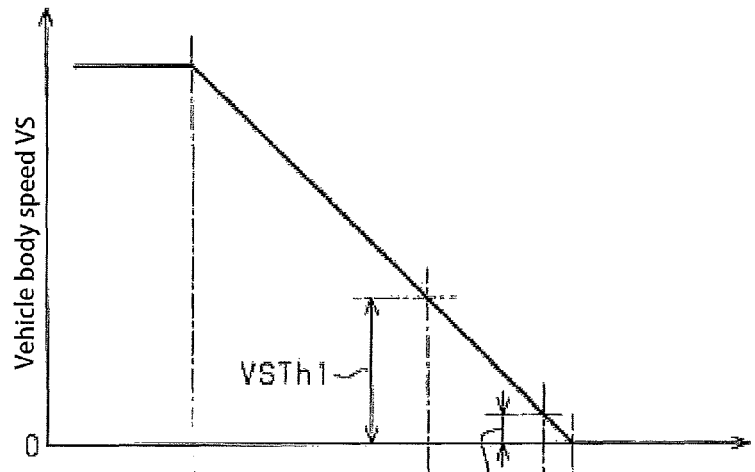
FIGS. 7(a) to 7(c) are timing charts during brake operation, and FIG. 7(a) indicates transition of vehicle body speed, FIG. 7(b) indicates transition of required braking force and regeneration braking force, and FIG. 7(c) indicates transition of hydraulic braking force.

A vehicle brake system according to a first embodiment will now be described below with reference to FIGS. 1 to 10. It is assumed in the following description herein that the vehicle travels (advances) forward (ahead of the vehicle).

FIG. 1 depicts a hybrid vehicle including the brake system according to the present embodiment. As depicted in FIG. 1, the hybrid vehicle includes a two-motor hybrid system 10, a hydraulic brake device 20 configured to apply braking force (hydraulic braking force) to all wheels FL, FR, RL, and RR, and a control device 100 configured to totally control the vehicle.

The hybrid system 10 includes an engine 11 operated by supplied fuel such as gasoline. The engine 11 has a crank shaft 11a that is coupled to a first motor 13 and a second motor 14 via a power transmission mechanism 12 having a planetary gear mechanism and the like. The power transmission mechanism 12 divisionally transmits motive power from the engine 11 to the first motor 13 and the front wheels FL and FR serving as driving wheels. The power transmission mechanism 12 transmits motive power from the second motor 14 to the front wheels FL ad FR while the second motor 14 is driven.

The first motor 13 generates electric power from the motive power transmitted via the power transmission mechanism 12. The electric power generated by the first motor 13 is supplied, via an inverter 15, to a battery 16 to be stored therein.

The second motor 14 functions as a vehicle driving source when a driver operates an accelerator pedal 18. The second motor 14 is supplied with electric power from the battery 16 via the inverter 15. Motive power generated by the second motor 14 is transmitted to the front wheels FL and FR via the power transmission mechanism 12 and a differential gear 17. There is provided, adjacent to the accelerator pedal 18, an accelerator position sensor SE1 configured to output, to the control device 100, a signal corresponding to an accelerator operation amount as the amount of operation to the accelerator pedal 18.

Motive power caused by rotating the front wheels FL and FR is transmitted to the second motor 14 via the differential gear 17 and the power transmission mechanism 12 during driver's brake operation of operating a brake pedal 21 as a brake operating member. The second motor 14 functions as a dynamo in this case, and electric power generated by the second motor 14 is supplied, via the inverter 15, to the battery 16 to be stored therein. The second motor 14 configured to generate electric power in this manner applies, to the vehicle, regeneration braking force corresponding to an electric power generation amount of the second motor 14. The second motor 14 thus exemplifies a "regeneration brake device" in the present embodiment.

The hydraulic brake device 20 will be described next.

The hydraulic brake device 20 includes a basal fluid pressure supply device 50 exemplifying a fluid pressure generator to which the brake pedal 21 is coupled so as to be driven by the fluid pressure generator, and a brake actuator 30 configured to automatically adjust hydraulic braking force to the wheels FL, FR, RL, and RR. The brake pedal 21 is provided with a brake operation amount sensor SE2 configured to output, to the control device 100, a signal corresponding to a brake operation amount Y indicative of an operation amount of the brake pedal 21.

As depicted in FIG. 2, the brake actuator 30 is provided with dual hydraulic circuits 311 and 312. The first hydraulic circuit 311 is connected with a wheel cylinder 22a for the front left wheel and a wheel cylinder 22b for the front right wheel whereas the second hydraulic circuit 312 is connected with a wheel cylinder 22c for the rear left wheel and a wheel cylinder 22d for the rear right wheel. When brake fluid is fed from the basal fluid pressure supply device 50 to the first and second hydraulic circuits 311 and 312, the brake fluid flows into the wheel cylinders 22a to 22d to increase a WC pressure as a fluid pressure in each of the wheel cylinders 22a to 22d. Each of the wheels FL, FR, RL, and RR thus receives hydraulic braking force corresponding to the WC pressure.

There are provided, on a channel connecting a master cylinder 61 in the basal fluid pressure supply device 50 and the wheel cylinders 22a to 22d, differential pressure control valves 321 and 322 as linear solenoid valves of the electromagnetic type. The first hydraulic circuit 311 is provided with a channel 33a for the front left wheel and a channel 33b for the front right wheel, which are located closer to the wheel cylinders 22a and 22b than the differential pressure control valve 321. The second hydraulic circuit 312 is provided with a channel 33c for the rear left wheel and a channel 33d for the rear right wheel, which are located closer to the wheel cylinders 22c and 22d than the differential pressure control valve 322. The channels 33a to 33d are provided with pressurizing valves 34a to 34d as constantly opened solenoid valves configured to operate in order to regulate increase of the WC pressures in the wheel cylinders 22a to 22d and depressurizing valves 35a to 35d as constantly closed solenoid valves configured to operate in order to decrease the WC pressures, respectively.

The first and second hydraulic circuits 311 and 312 are connected with reservoirs 361 and 362 configured to temporarily reserve brake fluid flown out of the wheel cylinders 22a to 22d via the depressurizing valves 35a to 35d and feed pumps 381 and 382 configured to operate in accordance with rotation of a pump motor 37, respectively. The reservoirs 361 and 362 are connected to the feed pumps 381 and 382 via suction flow paths 391 and 392 and are also connected, via master flow paths 401 and 402, to passages closer to the master cylinder 61 than the differential pressure control valves 321 and 322. The feed pumps 381 and 382 are connected, via feed flow paths 411 and 412, to connection points 421 and 422 between the differential pressure control valves 321 and 322 and the pressurizing valves 34a to 34d. When the pump motor 37 is driven, the feed pumps 381 and 382 draw brake fluid from the reservoirs 361 and 362 and the master cylinder 61 via the suction flow paths 391 and 392 and the master flow paths 401 and 402, and discharge the brake fluid into the feed flow paths 411 and 412, respectively.

As depicted in FIGS. 2 and 3, the basal fluid pressure supply device 50 includes a fluid pressure source 51. The fluid pressure source 51 includes an atmospheric pressure reservoir 52 configured to reserve brake fluid exemplifying fluid, an accumulator 53 configured to accumulate high-pressure brake fluid, and an accumulating pump 54 configured to pressure feed brake fluid from the atmospheric pressure reservoir 52 to the accumulator 53. The fluid pressure source 51 is provided with a pressure sensor SE3 configured to detect an accumulated pressure in the accumulator 53 and a relief valve 55 configured to return part of the brake fluid in the accumulator 53 to the atmospheric pressure reservoir 52 when the accumulated pressure is excessively high.

The basal fluid pressure supply device 50 also includes the master cylinder 61 having a bottomed cylindrical shape, an operating rod 62 configured to shift leftward and rightward in the figures in accordance with operation to the brake pedal 21, and a rubber boot 63 in a bellows shape. The master cylinder 61 is provided, at an open end (the right end in the figures), with a sleeve support wall 611 in an inward flange shape. The boot 63 has a first end fitted to the open end of the master cylinder 61 and a second end fitted to the operating rod 62. In the present description, the leftward direction in FIG. 3 in which the operating rod 62 is shifted by driver's brake operation will be referred to as an "operating direction +X" whereas the opposite rightward direction in FIG. 3 will be referred to as a "canceling direction −X".

The master cylinder 61 and the boot 63 form an internal space 64 in which a first master piston 651, a second master piston 652, and a valve device 66 are disposed in the mentioned order from the farthest position from the brake pedal 21. The first master piston 651 is constantly biased in the canceling direction −X by a first biasing member 671 and supports a second biasing member 672. The second master piston 652 is constantly biased in the canceling direction −X by the second biasing member 672.

When the brake pedal 21 is operated, the first and second master pistons 651 and 652 slide in the operating direction +X along the side wall of the master cylinder 61. This increases the fluid pressure in a first master chamber 681 between the bottom wall of the master cylinder 61 and the first master piston 651 and the fluid pressure in a second master chamber 682 between the first master piston 651 and the second master piston 652. The amount, corresponding to the fluid pressures in the first and second master chambers 681 and 682, of the brake fluid flows out of the master cylinder 61 via feed paths 614 and 615 provided at the side wall of the master cylinder 61 and is fed into the wheel cylinders 22a to 22d via the hydraulic circuits 311 and 312 of the brake actuator 30. The fluid pressure in each of the first and second master chambers 681 and 682 will be referred to as a "basal fluid pressure Pmc".

The side wall of the master cylinder 61 is provided with a first communicating path 612 between the first master chamber 681 and the exterior of the master cylinder 61, and a second communicating path 613 between the second master chamber 682 and the exterior of the master cylinder 61. The first and second communicating paths 612 and 613 are connected to a feed pipe 69 extending from the atmospheric pressure reservoir 52.

While the brake pedal 21 is not operated, the atmospheric pressure reservoir 52 communicates with the first and second master chambers 681 and 682 via the first communicating paths 612 and 613 and the feed pipe 69. In a case where the feed pumps 381 and 382 of the brake actuator 30 are actuated in this state, even if brake fluid in the first and second master chambers 681 and 682 is drawn by the feed pumps 381 and 382, brake fluid is supplemented from the atmospheric pressure reservoir 52 to the first and second master chambers 681 and 682. The first and second master chambers 681 and 682 are hardly changed in brake fluid amount or basal fluid pressure Pmc.

While the brake pedal 21 is operated and the first and second master pistons 651 and 652 are shifting in the operating direction +X, the first and second master pistons 651 and 652 block communication between the atmospheric pressure reservoir 52 and the first and second master chambers 681 and 682 via the first and second communicating paths 612 and 613 and the feed pipe 69. In a case where the feed pumps 381 and 382 of the brake actuator 30 are actuated in this state, if brake fluid in the first and second master chambers 681 and 682 is drawn by the feed pumps 381 and 382, no brake fluid is supplemented from the atmospheric pressure reservoir 52 to the first and second master chambers 681 and 682. Accordingly, the brake fluid in the first and second master chambers 681 and 682 is decreased and the basal fluid pressure Pmc is decreased.

The valve device 66 operates to allow and block communication between the fluid pressure source 51 and a booster chamber 70 configured to store assist force to driver's brake operation force. The valve device 66 and the fluid pressure source 51 form an exemplary booster device 71 configured to further largely assist operation force of the brake pedal 21 as a booster pressure or a fluid pressure in the booster chamber 70 is higher.

The valve device 66 includes a sleeve 72 configured to slide in the operating direction +X and the canceling direction −X along the side wall of the master cylinder 61, and a spool 73 configured to slide in the operating direction +X and the canceling direction −X inside the sleeve 72. The sleeve 72 is provided therein with an elastic body 74 closing an opening at the end in the operating direction +X of the sleeve 72 and a plunger 75 disposed between the sleeve 72 and the elastic body 74. The valve device 66 is connected to the second master piston 652 via a pushrod 83.

An atmosphere releasing chamber 76 is provided between the second master piston 652 and the valve device 66 in the internal space 64. The side wall of the master cylinder 61 is provided with a release passage 616 allowing communication between the atmosphere releasing chamber 76 and the exterior of the master cylinder 61. The release passage 616 communicates with the interior of the atmospheric pressure reservoir 52 via a discharge pipe 56. The atmosphere releasing chamber 76 and the atmospheric pressure reservoir 52 are substantially equal in internal pressure.

The sleeve 72 of the valve device 66 has a first cylindrical portion 721, a second cylindrical portion 722, and a third cylindrical portion 723 having different outer diameters. The second cylindrical portion 722 is accommodated in the master cylinder 61 so as to be slidable in the operating direction +X and the canceling direction −X along the side wall of the master cylinder 61. The second cylindrical portion 722 is larger in outer diameter than the first and third cylindrical portions 721 and 723. The booster chamber 70 is located between the second cylindrical portion 722 and the sleeve support wall 611.

The first cylindrical portion 721 is located at a position shifted in the operating direction +X from the second cylindrical portion 722. The outer diameter of the first cylindrical portion 721 is smaller than the outer diameter of the second cylindrical portion 722 and the inner diameter of the master cylinder 61. The first cylindrical portion 721 and the side wall of the master cylinder 61 are provided therebetween with an annular axial liquid path 77. The side wall of the master cylinder 61 is provided with a communicating path 617 between the interior and the exterior of the master cylinder 61. The axial liquid path 77 is connected to the accumulator 53 via the communicating path 617 and a feed pipe 57. The pressure in the axial liquid path 77 is substantially equal to the accumulated pressure in the accumulator 53.

The first and the second cylindrical portions 721 and 722 are provided at the border therebetween with a radially extending through hole 72a. The axial liquid path 77 communicates with the space in the sleeve 72 via the through hole 72a.

The first cylindrical portion 721 is provided therein with an open space 78 between the spool 73 and the elastic body 74. The first cylindrical portion 721 is provided with a drain passage 72b that allows communication between the open space 78 and the atmosphere releasing chamber 76 located at a position shifted in the operating direction +X from the valve device 66.

The first cylindrical portion 721 is divided into a large diameter portion 721A having a large inner diameter and a small diameter portion 721B having a small inner diameter. The large diameter portion 721A is located at a position shifted in the operating direction +X from the small diameter portion 721B, and the elastic body 74 is accommodated in the large diameter portion 721A.

The third cylindrical portion 723 is located at a position shifted in the canceling direction −X from the second cylindrical portion 722. The outer diameter of the third cylindrical portion 723 is substantially equal to the inner diameter of the sleeve support wall 611 of the master cylinder 61. The third cylindrical portion 723 projects from the interior of the master cylinder 61 into the boot 63 through the sleeve support wall 611.

The third cylindrical portion 723 is provided therein with an actuating member 79 in a columnar shape. The actuating member 79 is slidable in the operating direction +X and the canceling direction −X along the inner peripheral surface of the third cylindrical portion 723. The end in the canceling direction −X of the actuating member 79 is in contact with the operating rod 62 whereas the end in the operating direction +X of the actuating member 79 is in contact with the spool 73. When the brake pedal 21 is operated, driver's brake operation force is transmitted to the spool 73 via the operating rod 62 and the actuating member 79.

The sleeve 72 is provided, between the first cylindrical portion 721 and the third cylindrical portion 723, with a connecting passage 72c that allows communication between the booster chamber 70 and the space in the sleeve 72.

The spool 73 has a first land portion 731, a second land portion 732 located at a position shifted in the canceling direction −X from the first land portion 731, and a third land portion 733 located at a position shifted in the canceling direction −X from the second land portion 732. The second land portion 732 is smaller in outer diameter than the first and third land portions 731 and 733. An import passage 80 in a ring shape is provided between the outer peripheral surface of the second land portion 732 and the inner peripheral surface of the sleeve 72. The import passage 80 communicates with the interior of the booster chamber 70 via a continuous passage 81 provided between the inner peripheral surface of the sleeve 72 and the outer peripheral surface of the third land portion 733 and the connecting passage 72c of the sleeve 72.

The plunger 75 is located inside the small diameter portion 721B of the first cylindrical portion 721 of the sleeve 72 and is slidable in the operating direction +X and the canceling direction −X with respect to the sleeve 72. As depicted in FIG. 3, the plunger 75 is in contact with the spool 73 but is distant from the elastic body 74 while the brake pedal 21 is not operated.

The valve device 66 has an outflow channel 82 allowing brake fluid to flow out of the booster chamber 70 into the open space 78. The outflow channel 82 extends from the spool 73 over the plunger 75. When the brake pedal 21 is not operated and the brake operation amount is increased or kept constant, the sleeve 72 closes an opening close to the spool 73, of the outflow channel 82. When the brake operation amount is decreased, the opening close to the spool 73 of the outflow channel 82 is opened and brake fluid in the booster chamber 70 flows to the outflow channel 82 via the opening and flows into the open space 78.

The basal fluid pressure supply device 50 will be described next in terms of its function in a case where the brake pedal 21 is operated and in a case where its operation is cancelled with reference to FIGS. 3 to 6.

As depicted in FIG. 3, the through hole 72a of the sleeve 72 is closed by the first land portion 731 of the spool 73 when the brake pedal 21 is not operated. Communication between the accumulator 53 of the fluid pressure source 51 and the booster chamber 70 in the master cylinder 61 is thus blocked. If the booster chamber 70 increases in volume in this state, the booster chamber 70 is decreased in booster pressure correspondingly. That is, there is no assist to driver's brake operation force.

The valve device 66 operates when operation to the brake pedal 21 starts. Specifically, the actuating member 79 is pressed by the operating rod 62 coupled to the brake pedal 21 and is slid in the operating direction +X. The spool 73 is then pressed by the actuating member 79 and is slid in the operating direction +X relatively to the sleeve 72. If a shift amount of the spool 73 relative to the sleeve 72 is less than an assist start amount ΔM, the spool 73 continuously closes the through hole 72a of the sleeve 72 to continuously block communication between the accumulator 53 and the booster chamber 70. That is, the booster device 71 does not assist driver's brake operation force until the shift amount of the spool 73 relative to the sleeve 72 reaches the assist start amount ΔM.

As depicted in FIG. 3, there is a gap between the plunger 75 and the elastic body 74 when the brake pedal 21 is not operated. Even if the spool 73 and the plunger 75 are slid in the operating direction +X by driver's brake operation, its brake operation force will not be transmitted to the pushrod 83. Accordingly, the first and second master pistons 651 and 652 do not slid in the operating direction +X and the basal fluid pressure Pmc as the fluid pressure in each of the first and second master chambers 681 and 682 does not increase.

As depicted in FIG. 4, if the brake operation amount further increases, the shift amount of the spool 73 relative to the sleeve 72 becomes not less than the assist start amount ΔM. The through hole 72a of the sleeve 72 is then opened to communicate with the import passage 80 located outside the periphery of the second land portion 732 of the spool 73. The accumulator 53 and the booster chamber 70 are thus allowed to communicate with each other so that high-pressure brake fluid is fed from the accumulator 53 into the booster chamber 70. In such a state, the booster pressure in the booster chamber 70 is not decreased even if the sleeve 72 slides in the operating direction +X and the volume of the booster chamber 70 is increased. With the assist of the booster pressure in the booster chamber 70, the sleeve 72 is slid in the operating direction +X along with the spool 73.

When the shift amount of the spool 73 relative to the sleeve 72 becomes not less than the assist start amount ΔM, the plunger 75 comes into contact with the elastic body 74, which is compressed by the sleeve 72 sliding in the operating direction +X and the plunger 75 biased in the canceling direction −X by the first and second master chambers 681 and 682. This compression force is applied to the brake pedal 21 as reactive force via the plunger 75, the spool 73, the actuating member 79, and the operating rod 62. The compressed elastic body 74 presses the pushrod 83 in the operating direction +X. Brake operation force assisted by the booster device 71 is transmitted to the pushrod 83 that presses the first and second master pistons 651 and 652 in the operating direction +X. The volume in the first and second master chambers 681 and 682 is accordingly decreased, and communication between the first and second master chambers 681 and 682 and the atmospheric pressure reservoir 52 is blocked by the first and second master pistons 651 and 652. This increases the basal fluid pressure Pmc as the fluid pressure in each of the first and second master chambers 681 and 682. The brake fluid in the first and second master chambers 681 and 682 is fed into the wheel cylinders 22a to 22d via the hydraulic circuits 311 and 312 of the brake actuator 30.

The sleeve 72 receiving the booster pressure in the booster chamber 70 is slid in the operating direction +X immediately after transition to a keeping state where driver's brake operation is kept constant. The spool 73 does not slide in the keeping state where the brake operation amount does not increase. As depicted in FIG. 5, the sleeve 72 slides in the operating direction +X with respect to the spool 73, so that the through hole 72a of the sleeve 72 is closed by the first land portion 731 of the spool 73. This blocks communication between the accumulator 53 and the booster chamber 70. In this case, communication between the outflow channel 82, which is provided over the spool 73 and the plunger 75, and the booster chamber 70 are blocked continuously. This constantly keeps the booster pressure in the booster chamber 70. Press force applied from the pushrod 83 to the first and second master pistons 651 and 652 is also kept constant in this case, and the basal fluid pressure Pmc in each of the first and second master chambers 681 and 682 is kept at the fluid pressure at the transition to the keeping state.

If operation to the brake pedal 21 is cancelled or brake operation force is decreased thereafter, the first and second master pistons 651 and 652 are slid in the canceling direction −X by biasing force of the first and second biasing members 671 and 672.

As depicted in FIG. 6, the second master piston 652 presses the pushrod 83 in the canceling direction −X. In this case, the pushrod 83 presses the elastic body 74 in the canceling direction −X to deform the elastic body 74. The plunger 75 and the spool 73, which are pressed by the deformed elastic body 74, are slid in the canceling direction −X relatively to the sleeve 72.

In this case, communication between the accumulator 53 and the booster chamber 70 is blocked continuously whereas the booster chamber 70 communicates with the outflow channel 82. When the sleeve 72 also slides in the canceling direction −X along with the spool 73 sliding in the canceling direction −X, the volume of the booster chamber 70 is decreased. Accordingly, brake fluid in the booster chamber 70 flows out to the atmosphere releasing chamber 76 via the outflow channel 82, the open space 78, and the drain passage 72b. As depicted in FIG. 3, part of the brake fluid in the atmosphere releasing chamber 76 is discharged to the atmospheric pressure reservoir 52 via the communicating path 617 and the discharge pipe 56.

Described next is the control device 100 mounted on the hybrid vehicle.

As depicted in FIG. 1, the control device 100 is electrically connected with the accelerator position sensor SE1 and the brake operation amount sensor SE2 as well as a vehicle speed sensor SE4 configured to detect vehicle body speed VS. The control device 100 is also electrically connected with the pressure sensor SE3 configured to detect an accumulated pressure in the accumulator 53 and a basal fluid pressure detection sensor SE5 configured to detect the basal fluid pressure Pmc in the master cylinder 61 (see FIG. 2).

The control device 100 totally controls the vehicle in accordance with detection signals transmitted from various detection systems such as the sensors SE1 to SE5.

The control device 100 thus configured includes a power management computer 101, an engine control unit 102 configured to control the engine 11, a motor control unit 103 configured to control the first and second motors 13 and 14, and a brake control unit 104 configured to control the hydraulic brake device 20.

When a driver operates the accelerator, the power management computer 101 calculates motive power required to the engine 11 as well as motive power required to the second motor 14 in accordance with a vehicle travel state. The power management computer 101 individually transmits, to the engine control unit 102 and the motor control unit 103, control commands according to the required motive power thus calculated.

The power management computer 101 also calculates regeneration braking force applicable to the front wheels FL and FR at such timing from a state of charge of the battery 16, wheel speed of each of the front wheels FL and FR, and the like at the timing. The power management computer 101 transmits, to the brake control unit 104, the regeneration braking force at the timing thus calculated.

The power management computer 101 receives information on required regeneration braking force calculated by the brake control unit 104 when vehicle speed is reduced by driver's brake operation. The power management computer 101 then transmits the received information to the motor control unit 103.

The motor control unit 103 receives information on the required regeneration braking force from the power management computer 101 when vehicle speed is reduced by driver's brake operation. The motor control unit 103 then causes the second motor 14 to generate electric power so that regeneration braking force equivalent to the required regeneration braking force based on the received information is applied to the front wheels FL and FR.

During driver's brake operation, the brake control unit 104 computes a brake operation amount in accordance with a signal from the brake operation amount sensor SE2 and computes required braking force to the vehicle by the driver in accordance with the brake operation amount. The brake control unit 104 calculates required regeneration braking force in accordance with the computed required braking force to the vehicle, regeneration braking force generated at the front wheels FL and FR at such timing, and the like, and transmits information on the required regeneration braking force to the power management computer 101.

The brake control unit 104 does not actuate the brake actuator 30 if determining that the required braking force to the vehicle can be covered only by regeneration braking force. Specifically, the brake control unit 104 does not cause the hydraulic brake device 20 to apply hydraulic braking force to the vehicle. If the required braking force to the vehicle cannot be covered only by regeneration braking force, the brake control unit 104 causes hydraulic braking force to be applied to the vehicle. Such management on regeneration braking force and hydraulic braking force improves efficiency of recovering regeneration energy. In this regard, the second motor 14, the battery 16, the hydraulic brake device 20, and the control device 100 configure an exemplary "vehicle brake system".

Figure 7B:
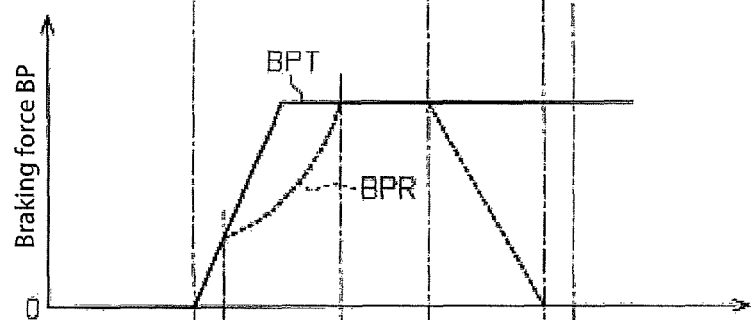
Figure 7C:
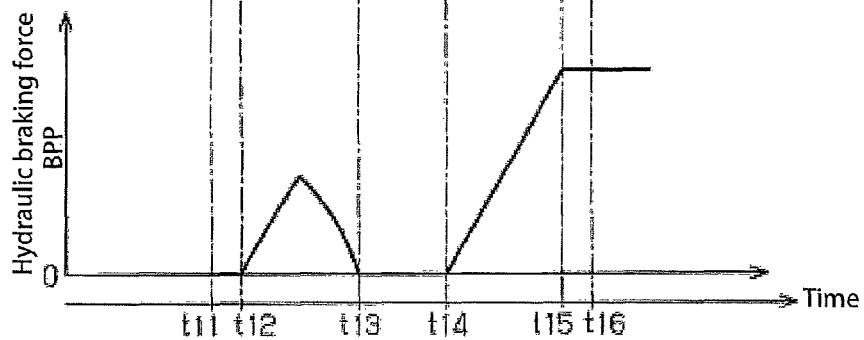

Described next with reference to the timing charts in FIGS. 7(a) to 7(c) is exemplary cooperative control on regeneration braking force BPR and hydraulic braking force BPP during vehicle braking with brake operation.

As indicated in FIGS. 7(a) to 7(c), when brake operation starts at a first time point t11, required braking force BPT gradually increases in accordance with increase in brake operation amount. The required braking force BPT can be covered by the regeneration braking force BPR immediately after the brake operation starts. However, delay of response by the regeneration braking force BPR generates a gap between the required braking force BPT and the regeneration braking force BPR from a second time point t12.

From the second time point t12, the brake actuator 30 is actuated to equalize a difference obtained by subtracting the regeneration braking force BPR from the required braking force BPT with the hydraulic braking force BPP. Then, the differential pressure control valves 321 and 322 as well as the feed pumps 381 and 382 are actuated in the brake actuator 30. This generates differential pressures between the master cylinder 61 and the wheel cylinders 22a to 22d and increases the WC pressures in the wheel cylinders 22a to 22d. The required braking force BPT and the regeneration braking force BPR are equalized with each other at a third time point t13. Accordingly, the brake actuator 30 is stopped and the hydraulic braking force BPP becomes "zero (0)".

When braking force BP is applied to the vehicle in this manner, the vehicle body speed VS is decreased gradually. At a fourth time point t14, the vehicle body speed VS reaches a start determination value VSTh1 indicating reallocation start speed set at the timing and can be determined as having been reduced. Accordingly started at the fourth time point t14 is reallocation control of gradually decreasing the regeneration braking force BPR and gradually increasing the hydraulic braking force BPP. This reallocation control causes the vehicle body speed VS to reach an end determination value VSTh2 indicating reallocation end speed at a fifth time point t15 before the vehicle stops. At the timing when the vehicle body speed VS reaches the end determination value VSTh2, the reallocation control of reallocating the regeneration braking force BPR with the hydraulic braking force BPP is completed and the regeneration braking force BPR becomes "zero (0)". The hydraulic braking force BPP is equal to the required braking force BPT from the fifth time point t15 to a sixth time point t16 when the vehicle stops.

The brake actuator 30 is actuated to gradually increase the hydraulic braking force BPP in reallocation control. The first and second master chambers 681 and 682 are blocked from the atmospheric pressure reservoir 52 in a state where the brake operation amount is larger than a specified amount. The brake actuator 30 is thus actuated to decrease the brake fluid in the first and second master chambers 681 and 682. In other words, the basal fluid pressure Pmc in each of the first and second master chambers 681 and 682 is decreased and the first and second master pistons 651 and 652 become likely to be slid (displaced) in the operating direction +X.

In a case where the brake actuator 30 is not actuated and the brake operation amount transitions from an increasing state to the keeping state, the basal fluid pressure Pmc at such transition timing will be referred to as a "reference basal fluid pressure Pmc_B". If the brake actuator 30 starts operation in the keeping state, the basal fluid pressure Pmc is gradually decreased from the reference basal fluid pressure Pmc_B.

Driver's brake operation force is substantially constant in the keeping state. In the keeping state, driver's brake operation force, which is not assisted by the booster device 71, is applied to the pushrod 83 via the spool 73, the plunger 75, and the elastic body 74. Accordingly, the first and second master pistons 651 and 652 are slid in the operating direction +X and the spool 73 and the plunger 75 are slid in the operating direction +X along therewith.

No high-pressure brake fluid flows from the accumulator 53 into the booster chamber 70 in this case, and the sleeve 72 hardly slides. The spool 73 and the plunger 75 thus slide in the operating direction +X relatively to the sleeve 72.

In a case where the basal fluid pressure Pmc has an amount of decrease ΔPmc from the reference basal fluid pressure Pmc_B being less than a specified amount of decrease ΔPmcTh, even if the spool 73 slides relatively to the sleeve 72 in the operating direction +X, the shift amount of the spool 73 relative to the sleeve 72 is less than the assist start amount ΔM. The spool 73 thus continuously closes the through hole 72a of the sleeve 72 and communication between the accumulator 53 and the booster chamber 70 is blocked. Assist efficiency of the booster device 71 to brake operation force is not improved in such a state, so that the brake pedal 21 is hardly displaced. In other words, even when the brake actuator 30 is actuated to decrease the basal fluid pressure Pmc in the keeping state, a driver is unlikely to have strange feeling due to the decrease in basal fluid pressure Pmc.

The brake actuator 30 is continuously actuated. When the amount of decrease ΔPmc of the basal fluid pressure Pmc from the reference basal fluid pressure Pmc_B reaches the specified amount of decrease ΔPmcTh, the shift amount of the spool 73 relative to the sleeve 72 reaches the assist start amount ΔM. The first land portion 731 of the spool 73 is then located at a position shifted in the operating direction +X from the through hole 72a of the sleeve 72, so as to open the through hole 72a of the sleeve 72 to cause the accumulator 53 and the booster chamber 70 to communicate with each other. High-pressure brake fluid thus flows from the accumulator 53 into the booster chamber 70, and the sleeve 72 is pressed by booster pressure in the booster chamber 70 and is slid in the operating direction +X. Such slide of the sleeve 72 in the operating direction +X is then transmitted to the first and second master pistons 651 and 652 via the pushrod 83, and the first and second master pistons 651 and 652 are largely slid in the operating direction +X. In this case, the spool 73 and the like are largely slid in the operating direction +X along with the sliding of the first and second master pistons 651 and 652. The brake pedal 21 is thus displaced in a direction of increasing the brake operation amount Y in spite of constant driver's brake operation force.

The brake pedal 21 is displaced at the speed corresponding to speed of decrease in basal fluid pressure Pmc. Specifically, if the speed of decrease in basal fluid pressure Pmc is high, the first and second master chambers 681 and 682, the spool 73, and the like slide in the operating direction +X at high speed and the brake pedal 21 also has high speed of displacement. In contrast, if the speed of decrease in basal fluid pressure Pmc is low, the first and second master chambers 681 and 682, the spool 73, and the like slide in the operating direction +X at low speed and the brake pedal 21 also has low speed of displacement.

The brake system according to the present embodiment thus performs the reallocation control by halfway changing a decrease gradient of the regeneration braking force BPR, or an increase gradient of the hydraulic braking force BPP. Assume that a "first period TM1" corresponds to a period in which the amount of decrease ΔPmc of the basal fluid pressure Pmc from the reference basal fluid pressure Pmc_B is less than the specified amount of decrease ΔPmcTh, and a "second period TM2" corresponds to a period in which the amount of decrease ΔPmc is not less than the specified amount of decrease ΔPmcTh. A first decrease gradient ΔDWN1 as the decrease gradient of the regeneration braking force BPR in the first period TM1 is made greater than a second decrease gradient ΔDWN2 as the decrease gradient of the regeneration braking force BPR in the second period TM2. In this case, a first increase gradient ΔUP1 as the increase gradient of the hydraulic braking force BPP in the first period TM1 becomes greater than a second increase gradient ΔUP2 as the increase gradient of the hydraulic braking force BPP in the second period TM2. The expression "the gradient becomes greater" is equal in meaning to the expression "the gradient increases" whereas the expression "the gradient becomes gentler" is equal in meaning to the expression "the gradient decreases".

In the brake system according to the present embodiment, the first decrease gradient ΔDWN1 corresponds to a first constant value whereas the second decrease gradient ΔDWN2 corresponds to a second constant value smaller than the first constant value. In the reallocation control performed by the brake system according to the present embodiment, the decrease gradient of the regeneration braking force BPR has two phases.

Figure 8A:
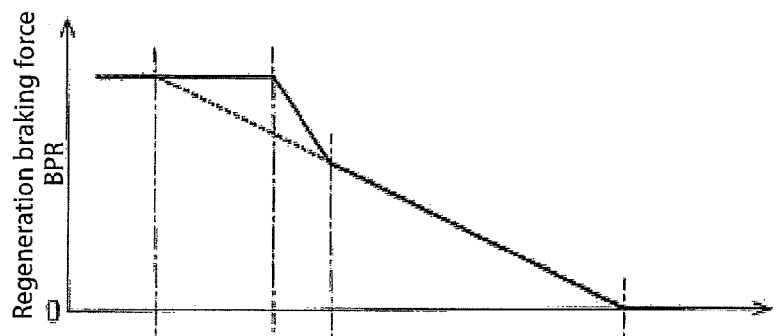
FIGS. 8(a) to 8(d) are timing charts during reallocation control, and FIG. 8(a) indicates transition of regeneration braking force, FIG. 8(b) indicates transition of hydraulic braking force, FIG. 8(c) indicates transition of a brake operation amount, and FIG. 8(d) indicates transition of a basal fluid pressure.
Figure 8B:
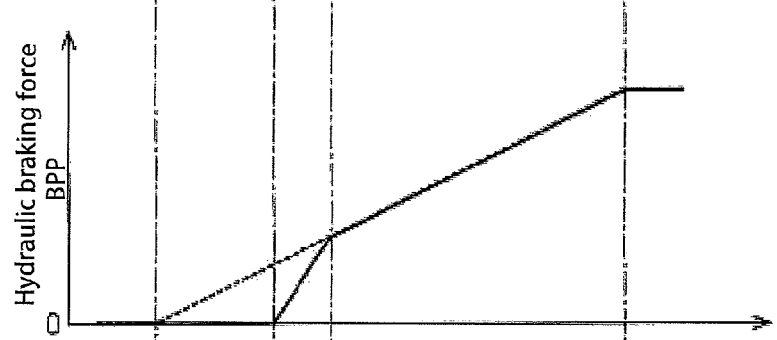
Figure 8C:
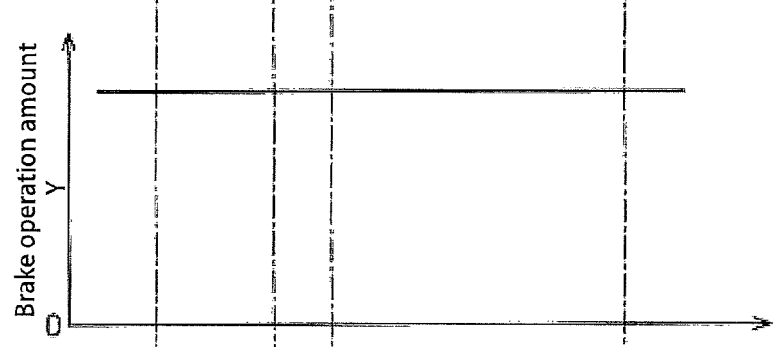
Figure 8D:
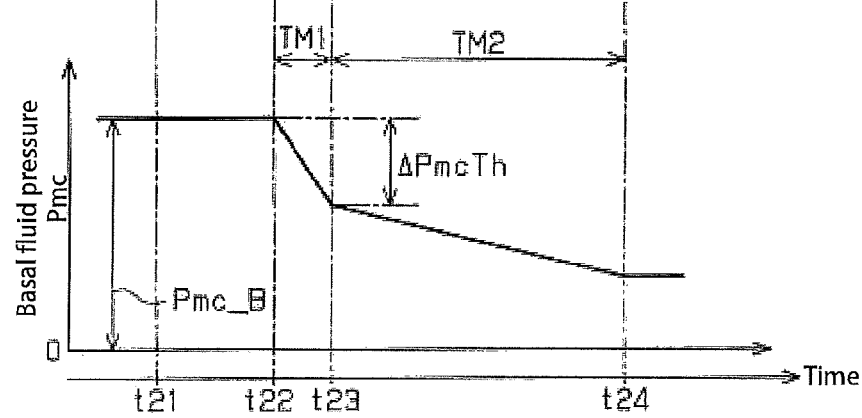

FIGS. 8(a) to 8(d) indicate, with solid lines, the reallocation control performed by the brake system according to the present embodiment, and indicate, with broken lines, reallocation control according to a comparative example in which a decrease gradient is kept constant at the level of the second decrease gradient ΔDWN2. Assume herein that the brake operation amount Y is constant as indicated in FIG. 8(c).

The reallocation control according to the comparative example starts at a first time point t21. The regeneration braking force BPR is decreased with a constant gradient (i.e. the second decrease gradient ΔDWN2) from the first time point t21 to a fourth time point t24. The hydraulic braking force BPP is increased with a constant gradient (i.e. the second increase gradient ΔUP2).

In contrast, the reallocation control performed by the brake system according to the present embodiment starts at a second time point t22 after the first time point t21. The decrease gradient of the regeneration braking force BPR from the second time point t22 in this case is equal to the first decrease gradient ΔDWN1 greater than the second decrease gradient ΔDWN2. Similarly, the increase gradient of the hydraulic braking force BPP is equal to the first increase gradient ΔUP1 greater than the second increase gradient ΔUP2.

The first decrease gradient ΔDWN1 and the first increase gradient ΔUP1 are set to values corresponding to maximum discharge speed of the feed pumps 381 and 382 of the brake actuator 30, for example. Accordingly, the regeneration braking force BPR is decreased rapidly and the hydraulic braking force BPP is increased rapidly in the first period TM1.

The amount of decrease ΔPmc of the basal fluid pressure Pmc from the reference basal fluid pressure Pmc_B reaches the specified amount of decrease ΔPmcTh at a third time point t23. Specifically, the first period TM1 lasts from the second time point t22 to the third time point t23 whereas the second period TM2 lasts from the third time point t23 to the fourth time point t24. At the third time point t23, the decrease gradient of the regeneration braking force BPR reaches the second decrease gradient ΔDWN2 whereas the increase gradient of the hydraulic braking force BPP reaches the second increase gradient ΔUP2.

In a case where the reallocation control is performed in the keeping state, in the first period TM1 in which the brake pedal 21 is hardly displaced, the speed of decrease in regeneration braking force BPR and the speed of increase in hydraulic braking force BPP are increased. In the second period TM2 in which the brake pedal 21 is likely to be displaced, the regeneration braking force BPR and the hydraulic braking force BPP change slowly. In comparison to the case of performing the reallocation control according to the comparative example, the start time point of the reallocation control can be delayed correspondingly to the increased amount of decrease in regeneration braking force BPR in the first period TM1. This achieves improvement in regeneration efficiency during brake operation. Furthermore, in the second period TM2, if the speed of decrease in basal fluid pressure Pmc is made equivalent to that of the reallocation control according to the comparative example, the speed of displacement of the brake pedal 21 becomes equivalent to that of the reallocation control according to the comparative example. This restrains deterioration in drivability.

Magnitude of the regeneration braking force BPR is substantially in proportion to the amount of electric power generated by the second motor 14. Specifically, efficiency of charge from the second motor 14 to the battery 16 improves as the regeneration braking force BPR is larger. In other words, the amount of electric power generated by the second motor 14 needs not to be increased if a state of charge SOC of the battery 16 is high in comparison to the case where the state of charge SOC is low. The brake system according to the present embodiment thus sets the second decrease gradient ΔDWN2 to be greater as the state of charge SOC of the battery 16 is lower in the reallocation control. However, the second decrease gradient ΔDWN2 is made gentler than the first decrease gradient ΔDWN1 regardless of how the state of charge SOC is low.

The start time point of the reallocation control changes if the second decrease gradient ΔDWN2 is changed in accordance with the state of charge SOC in this manner. Specifically, the start time point of the reallocation control can be further delayed as the state of charge SOC is lower, to achieve improvement in charging efficiency of the battery 16 during brake operation.

FIG. 9 depicts a map for determination of the start determination value VSTh1 used for determining the start time point of the reallocation control. As indicated in FIG. 9, the start determination value VSTh1 is set to a minimum value VSTh1min if the state of charge SOC is less than a first state of charge SOC1. The start determination value VSTh1 is set to a maximum value VSTh1max if the state of charge SOC is not less than a second state of charge SOC2 higher than the first state of charge SOC1. The start determination value VSTh1 is set to a larger value as the state of charge SOC is larger if the state of charge SOC is not less than the first state of charge SOC1 and less than the second state of charge SOC2.

Described next with reference to the flowchart in FIG. 10A and FIG. 10B are processing routine executed by the brake control unit 104 of the control device 100 during the reallocation control.

As depicted in FIG. 10A and FIG. 10B, in the present processing routine, the brake control unit 104 detects a current state of charge SOC of the battery 16 and sets the start determination value VSTh1 to a value corresponding to the current state of charge SOC with reference to the map in FIG. 9 (step S11). The brake control unit 104 subsequently acquires a vehicle body speed VS based on a signal from the vehicle speed sensor SE4, and determines whether or not the vehicle body speed VS is not more than the start determination value VSTh1 set in step S11 (step S12). If the vehicle body speed VS is higher than the start determination value VSTh1 (NO in step S12), the brake control unit 104 repeats the determination in step S12 until the vehicle body speed VS becomes not more than the start determination value VSTh1. In contrast, if the vehicle body speed VS becomes not more than the start detetermination value VSTh1 (YES in step S12), the brake control unit 104 starts the reallocation control.

Specifically, the brake control unit 104 sets the decrease gradient of the regeneration braking force BPR to the first decrease gradient $\Delta$DWN1 and transmits such a command to the power management computer 101 (step S13). This command is transmitted from the power management computer 101 to the motor control unit 103. The motor control unit 103 then controls the amount of electric power generated by the second motor 14 so that the regeneration braking force BPR applied from the second motor 14 to the vehicle is decreased with the first decrease gradient $\Delta$DWN1.

The brake control unit 104 subsequently sets the increase gradient of the hydraulic braking force BPP to the first increase gradient $\Delta$UP1 (step S14). The brake control unit 104 controls the differential pressure control valves 321 and 322 as well as the feed pumps 381 and 382 of the brake actuator 30 so that the hydraulic braking force BPP applied from the hydraulic brake device 20 to the vehicle is increased with the first increase gradient $\Delta$UP1.

The brake control unit 104 computes the amount of decrease $\Delta$Pmc of the basal fluid pressure Pmc from the reference basal fluid pressure Pmc_B, and determines whether or not the amount of decrease $\Delta$Pmc is not less than the specified amount of decrease $\Delta$PmcTh (step S15). Specifically, determined in step S15 is whether the current time point belongs to the first period TM1 in which the brake pedal 21 is unlikely to be displaced or to the second period TM2 in which the brake pedal 21 is likely to be displaced. If the amount of decrease $\Delta$Pmc is less than the specified amount of decrease $\Delta$PmcTh (NO in step S15), the brake control unit 104 can determine that the current time point belongs to the first period TM1 and thus shifts its processing to step S13 described earlier. In contrast, if the amount of decrease $\Delta$Pmc is not less than the specified amount of decrease $\Delta$PmcTh (YES in step S15), the brake control unit 104 can determine that the current time point belongs to the second period TM2 and thus shifts its processing to step S16 to be described below.

In step S16, the brake control unit 104 sets the decrease gradient of the regeneration braking force BPR to the second decrease gradient $\Delta$DWN2 gentler than the first decrease gradient $\Delta$DWN1, and transmits such a command to the power management computer 101. This command is transmitted from the power management computer 101 to the motor control unit 103. The motor control unit 103 then controls the amount of electric power generated by the second motor 14 so that the regeneration braking force BPR applied from the second motor 14 to the vehicle is decreased with the second decrease gradient $\Delta$DWN2.

The brake control unit 104 subsequently sets the increase gradient of the hydraulic braking force BPP to the second increase gradient $\Delta$UP2 gentler than the first increase gradient $\Delta$UP1 (step S17). The brake control unit 104 controls the differential pressure control valves 321 and 322 as well as the feed pumps 381 and 382 of the brake actuator 30 so that the hydraulic braking force BPP applied from the hydraulic brake device 20 to the vehicle is increased with the second increase gradient $\Delta$UP2.

Described below is an exemplary method of determining the second decrease gradient $\Delta$DWN2 and the second increase gradient $\Delta$UP2. As described above, the second decrease gradient $\Delta$DWN2 and the second increase gradient $\Delta$UP2 are determined in accordance with the state of charge SOC of the battery 16. For example, if the state of charge SOC is less than the first state of charge SOC1 indicated in FIG. 9, the second decrease gradient $\Delta$DWN2 and the second increase gradient $\Delta$UP2 are set to be greatest, or to the maximum values. If the state of charge SOC is not less than the second state of charge SOC2 indicated in FIG. 9, the second decrease gradient $\Delta$DWN2 and the second increase gradient $\Delta$UP2 are set to be gentlest, or to the minimum values. The state of charge SOC referred to for determination of the second decrease gradient $\Delta$DWN2 and the second increase gradient $\Delta$UP2 can be made equal to the state of charge SOC referred to for determination of the start determination value VSTh1 in step S11, or can be the most updated state of charge SOC.

The brake control unit 104 determines whether or not the vehicle body speed VS is not more than the end determination value VSTh2 (step S18). If the vehicle body speed VS is higher than the end determination value VSTh2 (NO in step S18), the brake control unit 104 shifts its processing to step S16 described earlier. In contrast, if the vehicle body speed VS is not more than the end determination value VSTh2 (YES in step S18), the brake control unit 104 ends the reallocation control and ends the present processing routine.

When the reallocation control is performed in this manner, the regeneration braking force BPR becomes "zero (0)" before the vehicle stops. The regeneration braking force BPR is "zero (0)" from the timing when the vehicle body speed VS becomes less than the end determination value VSTh2. The brake control unit 104 thus controls the brake actuator 30 so that the hydraulic braking force BPP is made equal to the required braking force BPT.

The configurations and functions described above achieve the following effects.

(1) The reallocation control starts when the vehicle is reduced in speed in accordance with driver's brake operation and the vehicle body speed VS becomes not more than the start determination value VSTh1. In this reallocation control, the first decrease gradient $\Delta$DWN1 as the decrease gradient of the regeneration braking force BPR in the first period TM1 is greater than the second decrease gradient $\Delta$DWN2 as the decrease gradient of the regeneration braking force BPR in the second period TM2. The first increase gradient $\Delta$UP1 as the increase gradient of the hydraulic braking force BPP in the first period TM1 accordingly becomes greater than the second increase gradient $\Delta$UP2 as the increase gradient of the hydraulic braking force BPP in the second period TM2.

The valve device 66 blocks communication between the accumulator 53 and the booster chamber 70 in the first period TM1, and the booster device 71 does not have high assist efficiency for brake operation force. The brake pedal 21 is kept unlikely to be displaced even if the basal fluid pressure Pmc decreases at high speed. In other words, drivability is unlikely to deteriorate in the first period TM1 even with a great decrease gradient of the regeneration braking force BPR.

The start time point of the reallocation control can be delayed by making the first decrease gradient $\Delta$DWN1 greater than the second decrease gradient $\Delta$DWN2, in comparison to the case of performing the reallocation control according to the comparative example in which the decrease gradient of the regeneration braking force BPR is kept constant at the level of the second decrease gradient ΔDWN2. This achieves improvement in regeneration efficiency during brake operation.

Furthermore, even with such a great decrease gradient of the regeneration braking force BPR in the first period TM1, the decrease gradient of the regeneration braking force BPR is made gentler in the subsequent second period TM2. Deterioration in drivability can thus be restrained in the second period TM2 similarly to the case of performing the reallocation control according to the comparative example. It is thus possible to restrain deterioration in drivability as well as deterioration in regeneration efficiency upon the reallocation control during brake operation.

(2) The second decrease gradient ΔDWN2 is made gentler as the state of charge SOC of the battery 16 is higher. The basal fluid pressure Pmc decreases at low speed if the state of charge SOC is relatively high. Accordingly, even if the brake pedal 21 is displaced, speed of the displacement can be made relatively low. It is thus possible to restrain deterioration in drivability caused by the reallocation control.

Meanwhile, if the state of charge SOC of the battery 16 is relatively low, the start time point of the reallocation control can be delayed by decreasing the start determination value VSTh1. This achieves improvement in regeneration efficiency.

Second Embodiment

A vehicle brake system according to a second embodiment will be described next with reference to FIGS. 11 and 12. The brake system according to the second embodiment includes a booster device configured differently from that of the first embodiment. The following description will mainly refer to the differences from the first embodiment and will not repeatedly refer to the members configured identically to those of the first embodiment, which are denoted by the identical reference signs.

FIG. 11 depicts a basal fluid pressure supply device 50A included in the hydraulic brake device 20. As depicted in FIG. 11, provided between a master cylinder 61A and the brake pedal 21 is a booster device 71A of the negative pressure type. The booster device 71A includes a booster shell 120 fixed at a position shifted in the canceling direction −X from the master cylinder 61A. The booster shell 120 includes a front shell 121 on a side in the operating direction +X and a rear shell 122 on a side in the canceling direction −X.

There is provided a rubber boot 123 in a bellows shape, between the end of the rear shell 122 in the canceling direction −X and the operating rod 62 coupled to the brake pedal 21. The boot 123 has a first end fixed to the end of the rear shell 122 in the canceling direction −X and a second end fixed to the operating rod 62. The booster shell 120 and the boot 123 form an internal space in which a valve device 124 is provided.

The booster shell 120 accommodates a partition member 125. The interior of the booster shell 120 is divided into a negative pressure chamber R1 as a space located at a position shifted in the operating direction +X from the partition member 125, and a booster chamber R2 as a space located at a position shifted in the canceling direction −X. The partition member 125 has a rubber diaphragm 126 and a metal plate 127. The valve device 124 is attached to the inner peripheral edge of the partition member 125.

The front shell 121 is provided with a negative pressure intake portion 121a communicating with an intake manifold of the engine 11 serving also as a negative pressure source. The negative pressure chamber R1 constantly has a negative pressure while the engine 11 is in operation. The negative pressure chamber R1 is communicable with the booster chamber R2 via the valve device 124 and is also communicable with an atmospheric pressure region (an atmosphere communicating space A1 to be described later) via the valve device 124. The booster device 71A is connected to the brake pedal 21 via the operating rod 62 and is also connected to the second master piston 652 via a pushrod 83A.

The valve device 124 will be described next with reference to FIG. 12. FIG. 12 depicts the booster device 71A in the keeping state where the brake operation amount Y as the operation amount of the brake pedal 21 is kept constant.

As depicted in FIG. 12, the valve device 124 includes a valve piston 131 supporting the inner peripheral edge of the partition member 125. The valve piston 131 is biased in the canceling direction −X by a canceling spring 140 disposed inside the booster shell 120. Provided at positions shifted in the operating direction +X from the valve piston 131 are a rubber elastic body 74A and the pushrod 83A.

The valve piston 131 includes a first piston portion 1311 on a side in the operating direction +X and a cylindrical second piston portion 1312 on a side in the canceling direction −X. The first piston portion 1311 is provided with a communicating path 132 that is opened to the end of the valve piston 131 in the operating direction +X and is also opened to the atmosphere communicating space A1 as the internal space of the second piston portion 1312. This communicating path 132 is located radially outside the operating rod 62 and communicates with the negative pressure chamber R1.

The first piston portion 1311 has a booster chamber communicating space A2 located inside the communicating path 132, and the booster chamber communicating space A2 communicates with the booster chamber R2. The booster chamber communicating space A2 is provided with a plunger 75A connected to the operating rod 62, and a reactive force member 133 is provided between the plunger 75A and the elastic body 74A. Reactive force from the elastic body 74A is transmitted to the plunger 75A via the reactive force member 133 in the keeping state.

The plunger 75A has a cylindrical portion 75A1 on a side in the canceling direction −X, and the tip end of the operating rod 62 is inserted to the cylindrical portion 75A1. The cylindrical portion 75A1 has an end in the canceling direction −X provided with a flange 75A2. A projection 75A3 in a flange shape is provided at a position shifted in the operating direction +X from the flange 75A2 outside the periphery of the cylindrical portion 75A1.

The first piston portion 1311 is provided, inside the communicating path 132, with an atmospheric pressure valve seat member 134 in a cylindrical shape, which is located at the outer periphery of the cylindrical portion 75A1 of the plunger 75A and is disposed coaxially with the plunger 75A. The atmospheric pressure valve seat member 134 is provided, at the end in the canceling direction −X, with a valve seat portion 1341 in an outward flange shape. The atmospheric pressure valve seat member 134 is provided, at the end in the operating direction +X, with a locking portion 1342 in an inward flange shape. In the keeping state, there is a gap between the locking portion 1342 and the projection 75A3 provided at the cylindrical portion 75A1 of the plunger 75A. A distance between the locking portion 1342 and the projection 75A3 corresponds to the "assist start amount ΔM".

The atmospheric pressure valve seat member 134 is biased in the canceling direction −X by a biasing member 137 that is disposed inside the first piston portion 1311.

The atmosphere communicating space A1 located inside the periphery of the second piston portion 1312 is provided with a valve body 135 in a disc shape and a valve body spring 136 biasing the valve body 135 in the operating direction +X. While the brake pedal 21 is not operated and in the keeping state, the valve body 135 is seated on an end of the first piston portion 1311 or the valve seat portion 1341 of the atmospheric pressure valve seat member 134 by biasing force of the valve body spring 136. When the valve body 135 is seated on the end of the first piston portion 1311, the communicating path 132 is closed by the valve body 135. Specifically, a portion located radially inside the opening of the communicating path 132 serves as a negative pressure valve seat 131a, and the negative pressure valve seat 131a and the valve body 135 configure an exemplary negative pressure valve.

When the valve body 135 is seated on the valve seat portion 1341 of the atmospheric pressure valve seat member 134, the valve body 135 closes the booster chamber communicating space A2 inside the first piston portion 1311. In other words, the valve seat portion 1341 and the valve body 135 configure an exemplary atmospheric pressure valve.

Described next is an effect of the case where the brake operation amount Y is increased from the keeping state.

When the brake operation amount Y is increased from the keeping state, the operating rod 62 shifts in the operating direction +X and the plunger 75A also shifts in the operating direction +X. If the shift amount of the plunger 75A is less than the assist start amount ΔM, the projection 75A3 of the plunger 75A is not locked to the locking portion 1342 of the atmospheric pressure valve seat member 134. The atmospheric pressure valve seat member 134 does not shift in the operating direction +X and communication between the communicating path 132 and the booster chamber communicating space A2 is kept blocked.

If the brake operation amount Y is further increased and the shift amount of the plunger 75A becomes not less than the assist start amount ΔM, the projection 75A3 of the plunger 75A is locked to the locking portion 1342 of the atmospheric pressure valve seat member 134. Along with the plunger 75 shifting, the atmospheric pressure valve seat member 134 shifts in the operating direction +X against biasing force of the biasing member 137. Accordingly, the atmospheric pressure valve is opened, the atmosphere communicating space A1 communicates with the booster chamber communicating space A2, and the atmosphere in the atmosphere communicating space A1 flows into the booster chamber R2 in communication with the booster chamber communicating space A2. This increases the booster pressure in the booster chamber R2. Driver's brake operation force is thus assisted by the booster device 71A, and the pushrod 83A presses the second master piston 652 in the operating direction +X. The first and second master pistons 651 and 652 then shift in the operating direction +X, and the basal fluid pressure Pmc in each of the first and second master chambers 681 and 682 is increased.

Described next is an effect of the case where the brake actuator 30 is actuated in the keeping state to decrease the basal fluid pressure Pmc.

When the basal fluid pressure Pmc is decreased, the first and second master pistons 651 and 652 become likely to shift in the operating direction +X. The operating rod 62 is connected to the second master piston 652 via the plunger 75A, the reactive force member 133, the elastic body 74A, and the pushrod 83. The operating rod 62 receives constant brake operation force from a driver in the keeping state. Along with the first and second master pistons 651 and 652 shifting in the operating direction +X, the operating rod 62 and the plunger 75A shift in the operating direction +X.

If the shift amount of the plunger 75A is less than the assist start amount ΔM, the projection 75A3 of the plunger 75A is not locked to the locking portion 1342 of the atmospheric pressure valve seat member 134. The atmospheric pressure valve seat member 134 does not shift in the operating direction +X and communication between the communicating path 132 and the booster chamber communicating space A2 is kept blocked. The booster pressure in the booster chamber R2 is not increased in this case. Accordingly, assist efficiency of the booster device 71A to brake operation force is not improved. The brake pedal 21 is kept unlikely to be displaced even if the first and second master pistons 651 and 652 shift in the operating direction +X.

When the brake actuator 30 is actuated and the basal fluid pressure Pmc is further decreased, the shift amounts of the first and second master pistons 651 and 652 in the operating direction +X are increased and the shift amount of the plunger 75A becomes not less than the assist start amount ΔM. The projection 75A3 of the plunger 75A is then locked to the locking portion 1342 of the atmospheric pressure valve seat member 134. Along with the plunger 75A shifting, the atmospheric pressure valve seat member 134 shifts in the operating direction +X against biasing force of the valve body spring 136. Specifically, the atmospheric pressure valve is opened, the atmosphere communicating space A1 communicates with the booster chamber communicating space A2, and the atmosphere in the atmosphere communicating space A1 flows into the booster chamber R2 in communication with the booster chamber communicating space A2. This increases the booster pressure in the booster chamber R2. Assist efficiency of the booster device 71A to brake operation force thus improves, and the brake pedal 21 becomes likely to be displaced.

The time point when the booster pressure increases can be found by monitoring the amount of decrease ΔPmc of the basal fluid pressure Pmc from the reference basal fluid pressure Pmc_B, as in the first embodiment. Specifically, if the amount of decrease ΔPmc is less than the specified amount of decrease ΔPmcTh, the atmospheric pressure valve is closed and the booster pressure is not increased. When the amount of decrease ΔPmc further increases and becomes not less than the specified amount of decrease ΔPmcTh, the atmospheric pressure valve is opened and the booster pressure is increased.

As in the first embodiment, the reallocation control starts when the vehicle body speed VS becomes not more than the start determination value VSTh1 during brake operation. When the amount of decrease ΔPmc of the basal fluid pressure Pmc from the reference basal fluid pressure PmcB is less than the specified amount of decrease ΔPmcTh, the current time point belongs to the first period TM1. Accordingly, the decrease gradient of the regeneration braking force BPR is set to the first decrease gradient ΔDWN1 and the speed of increase in hydraulic braking force BPP is set to the first increase gradient ΔUP1. When the amount of decrease ΔPmc of the basal fluid pressure Pmc becomes not less than the specified amount of decrease ΔPmcTh, the current time point belongs to the second period TM2. Accordingly, the decrease gradient of the regeneration braking force BPR is set to the second decrease gradient ΔDWN2 gentler than the first decrease gradient ΔDWN1. The speed of increase in hydraulic braking force BPP is set to the second increase gradient ΔUP2 gentler than the first increase gradient ΔUP1.

Third Embodiment

A vehicle brake system according to a third embodiment will be described next with reference to FIGS. 13 and 15. The brake system according to the third embodiment is different from those of the first and second embodiments in a method of changing the details of the reallocation control in accordance with the state of charge SOC of the battery 16. The following description will mainly refer to the differences from the first and second embodiments and will not repeatedly refer to the members configured identically to those of the first and second embodiments, which are denoted by the identical reference signs.

Initially described with reference to a map in FIG. 13 is a method of determining the start determination value VSTh1.

The brake system according to the present embodiment sets a reference start determination value VSTh1B corresponding to the state of charge SOC of the battery 16 with reference to the map in FIG. 13 for determining the start determination value VSTh1. Specifically, as indicated in FIG. 13, the reference start determination value VSTh1B is set to a first reference value VSTh1B1 if the state of charge SOC is less than a predetermined amount KSOC that is preliminarily set, and is set to a second reference value VSTh1B2 larger than the first reference value VSTh1B1 if the state of charge SOC is not less than the predetermined amount KSOC.

If the state of charge SOC is not less than the predetermined amount KSOC, the start determination value VSTh1 is set to the value equal to the second reference value VSTh1B2. If the state of charge SOC is less than the predetermined amount KSOC, the start determination value VSTh1 can be calculated in accordance with the following relational expression (Equation 1).

$$VSTh1 = VSTh1B1 \times G1 \quad \text{(Equation 1)}$$

The relational expression (Equation 1) includes "G1" that is a gain value corresponding to the state of charge SOC and is set to be more than "zero (0)" and not more than "1". The gain value G1 can be made smaller as the state of charge SOC is lower. In the case where the state of charge SOC is less than the predetermined amount KSOC, the start determination value VSTh1 is less than that of the case where the state of charge SOC is not less than the predetermined amount KSOC. Further, if the state of charge SOC is less than the predetermined amount KSOC, the start determination value VSTh1 decreases within a range less than the first reference value VSTh1B1 as the state of charge SOC is lower.

Described next with reference to the timing charts in FIGS. 14 and 15 are a method of decreasing the regeneration braking force BPR and a method of increasing the hydraulic braking force BPP in the reallocation control. Broken lines in FIGS. 14 and 15 indicate the reallocation control according to the comparative example in which the regeneration braking force BPR is decreased with a constant gradient.

The brake system according to the present embodiment changes the details of the reallocation control depending on whether or not the state of charge SOC of the battery 16 is not less than the predetermined amount KSOC. For example, if the state of charge SOC is less than the predetermined amount KSOC, the state of charge SOC of the battery 16 can be determined as being low. Accordingly selected is first reallocation control achieving high regeneration efficiency. In contrast, if the state of charge SOC is not less than the predetermined amount KSOC, the state of charge SOC can be determined as being high. Accordingly selected is second reallocation control focusing on drivability.

FIG. 14 indicates a state of decrease in regeneration braking force BPR in the case where the first reallocation control is performed. As indicated in FIG. 14, the brake control unit 104 sets the start determination value VSTh1, which is referred to for determination of the start time point of the reallocation control, to a value corresponding to the state of charge SOC of the battery 16 (step S11). If the vehicle body speed VS reaches the start determination value VSTh1 (YES in step S12), the state of charge SOC is less than the predetermined amount KSOC and the brake control unit 104 thus starts the first reallocation control. For example, the brake control unit 104 increases the decrease gradient ΔDWN of the regeneration braking force BPR in the first period TM1 as the state of charge SOC is lower, i.e., as the start determination value VSTh1 is smaller. In this case, the brake control unit 104 sets the increase gradient ΔUP of the hydraulic braking force BPP in the first period TM1 to a value corresponding to the decrease gradient ΔDWN of the regeneration braking force BPR in the first period TM1.

If the start determination value VSTh1 is relatively large in this case, the second reallocation control starts at a second time point t32 after a first time point t31. The first period TM1 lasts from the second time point t32 to a fourth time point t34. Accordingly, the decrease gradient ΔDWN of the regeneration braking force BPR in the first period TM1 is made relatively small. However, this decrease gradient ΔDWN is greater than the decrease gradient ΔDWN of the regeneration braking force BPR in the reallocation control according to the comparative example.

If the start determination value VSTh1 is relatively small, the second reallocation control starts at a third time point t33 after the second time point t32 and before the fourth time point t34. In this case, the first period TM1 lasts from the third time point t33 to the fourth time point t34. The decrease gradient ΔDWN of the regeneration braking force BPR in the first period TM1 is made relatively large.

When the first reallocation control starts, the brake actuator 30 is actuated to decrease the basal fluid pressure Pmc. When the amount of decrease ΔPmc reaches the specified amount of decrease ΔPmcTh, the brake control unit 104 sets the decrease gradient ΔDWN of the regeneration braking force BPR in the second period TM2 to the second decrease gradient ΔDWN2 (step S16) and sets the increase gradient ΔUP of the hydraulic braking force BPP in the second period TM2 to the second increase gradient ΔUP2 (step S17).

When the vehicle body speed VS subsequently reaches the end determination value VSTh2, reallocation from the regeneration braking force BPR to the hydraulic braking force BPP is completed. The brake control unit 104 thus ends the first reallocation control.

FIG. 15 indicates a state of decrease in regeneration braking force BPR in the case where the second reallocation control is performed. As indicated in FIG. 15, the brake control unit 104 sets the start determination value VSTh1, which is referred to for determination of the start time point of the reallocation control, to a fixed value (step S11). For example, this fixed value can be equivalent to the start determination value VSTh1 that is referred to for decreasing the regeneration braking force BPR with the second decrease gradient ΔDWN2 as in the reallocation control according to the comparative example. If the vehicle body speed VS reaches the start determination value VSTh1 (YES in step S12), the state of charge SOC is not less than the predetermined amount KSOC and the brake control unit 104 thus starts the second reallocation control. For example, the brake control unit 104 makes the decrease gradient ΔDWN of the regeneration braking force BPR in the first period TM1 greater as the state of charge SOC is lower. In this case, the brake control unit 104 sets the increase gradient ΔUP of the hydraulic braking force BPP in the first period TM1 to a value corresponding to the decrease gradient ΔDWN of the regeneration braking force BPR in the first period TM1.

In this case, the second reallocation control starts at a first time point t41 when the reallocation control according to the comparative example also starts. However, the decrease gradient ΔDWN of the regeneration braking force BPR is greater than the decrease gradient (e.g. the second decrease gradient ΔDWN2) of the regeneration braking force BPR in the reallocation control according to the comparative example. The first period TM1 transitions to the second period TM2 at a second time point t42 or a third time point t43 before a fourth time point t44 when the amount of decrease ΔPmc of the basal fluid pressure reaches the specified amount of decrease ΔPmcTh due to actuation of the brake actuator 30 in the reallocation control according to the comparative example.

If the amount of decrease ΔPmc of the basal fluid pressure is not less than the specified amount of decrease ΔPmcTh, the brake control unit 104 makes the decrease gradient ΔDWN of the regeneration braking force BPR gentler as the state of charge SOC is higher at the start timing of the second reallocation control. In this case, the second reallocation control ends at a fifth time point t45 regardless of the state of charge SOC at the start timing of the second reallocation control. The reallocation control according to the comparative example also ends at this fifth time point t45. When the second reallocation control is performed, the decrease gradient ΔDWN of the regeneration braking force BPR in the second period TM2 is made smaller than the decrease gradient of the regeneration braking force BPR in the reallocation control according to the comparative example.

The configurations and functions described above achieve the following effects in addition to the effect (1) in each of the first and second embodiments.

(3) If the state of charge SOC of the battery 16 is less than the predetermined amount KSOC, the state of charge SOC can be determined as being low. Accordingly performed is the first reallocation control achieving high regeneration efficiency. The battery 16 can thus be charged efficiently during vehicle braking. In contrast, if the state of charge SOC is not less than the predetermined amount KSOC, the state of charge SOC can be determined as being high. Accordingly performed is the second reallocation control focusing on restraint of deterioration in drivability. Deterioration in drivability can thus be restrained more effectively.

(4) When the first reallocation control is performed, the start determination value VSTh1 is made smaller as the state of charge SOC is lower. Regeneration efficiency can thus be improved as the state of charge SOC is lower. Moreover, the battery 16 can be charged efficiently during vehicle braking.

(5) When the second reallocation control is performed, the decrease gradient ΔDWN of the regeneration braking force BPR in the second period TM2 is made smaller as the state of charge SOC is higher. Deterioration in drivability can thus be restrained more effectively as the state of charge SOC is higher.

These embodiments can each be modified into any one of the following different embodiments.

According to the first embodiment, the second decrease gradient ΔDWN2, the second increase gradient ΔUP2, and the start determination value VSTh1 are changed depending on the state of charge SOC of the battery 16. Alternatively, the second decrease gradient ΔDWN2, the second increase gradient ΔUP2, and the start determination value VSTh1 can be set to constant values regardless of the state of charge SOC. Such a configuration also achieves an effect equivalent to the effect (1).

According to each of the above embodiments, the decrease gradient of the regeneration braking force BPR and the increase gradient of the hydraulic braking force BPP are made constant in the second period TM2. Alternatively, the decrease gradient of the regeneration braking force BPR and the increase gradient of the hydraulic braking force BPP can be made variable within a range having a gentler gradient than the gradient in the first period TM1. For example, the decrease gradient of the regeneration braking force BPR and the increase gradient of the hydraulic braking force BPP in the second period TM2 can be made gradually gentler as the vehicle body speed VS is reduced.

In the second embodiment, the first reallocation control can be performed as the reallocation control regardless of whether or not the state of charge SOC of the battery 16 is less than the predetermined amount KSOC. It is possible to achieve an effect equivalent to the effect (4) also in this case.

In the second embodiment, the second reallocation control can be performed as the reallocation control regardless of whether or not the state of charge SOC of the battery 16 is not less than the predetermined amount KSOC. It is possible to achieve an effect equivalent to the effect (5) also in this case.

The regeneration brake device can be embodied as an actuator other than a motor as long as it is configured to adjust the regeneration braking force BPR applied to the vehicle. For example, the regeneration brake device can be a simple dynamo that does not function as a driving source.

The brake actuator can be configured differently from the brake actuator 30 as long as it includes a differential pressure control valve and a feed pump.

Examples of the vehicle including the brake system according to each of the above embodiments can include a two-motor hybrid vehicle as well as a single-motor hybrid vehicle, as long as the vehicle includes the engine 11. When a dynamo is provided as the regeneration brake device, the vehicle can include only the engine 11 as a driving force.

The vehicle including the brake system according to the first embodiment may not include the engine 11. For example, the vehicle can be an electric vehicle.

Additionally described below are technical concepts obtained in each of the above embodiments and the different embodiments.

(A) The valve device
can be connected to the brake operating member, and
in the keeping state, can block communication between the fluid pressure source and the booster chamber if the amount of decrease of the basal fluid pressure from the reference basal fluid pressure due to actuation of the feed pump is less than the specified amount of decrease, and can allow communication between the fluid pressure source and the booster chamber if the amount of decrease of the basal fluid pressure from the reference basal fluid pressure is not less than the specified amount of decrease.

REFERENCE SIGNS LIST

14 . . . Second motor exemplifying regeneration brake device
16 . . . Battery
20 . . . Hydraulic brake device
21 . . . Brake pedal exemplifying brake operating member
22a-22d . . . Wheel cylinder
30 . . . Brake actuator
321, 322 . . . Differential pressure control valve
381, 382 . . . Feed pump
50, 50A . . . Basal fluid pressure supply device exemplifying fluid pressure generator
61, 61A . . . Master cylinder
651, 652 . . . Master piston
66, 124 . . . Valve device
70, R2 . . . Booster chamber
71, 71A . . . Booster device
100 . . . Control device
104 . . . Brake control unit exemplifying gradient setting unit
BPP . . . Hydraulic braking force
BPR . . . Regeneration braking force
FL, FR, RL, RR . . . Wheel
Pmc . . . Basal fluid pressure
Pmc_B . . . Reference basal fluid pressure
SOC . . . State of charge
TM1 . . . First period
TM2 . . . Second period
VS . . . Vehicle body speed
VSTh1 . . . Start determination value as reallocation start speed
VSTh2 . . . End determination value as reallocation end speed
Y . . . Brake operation amount
ΔPmc . . . Depressurization amount
ΔDWN . . . Decrease gradient
ΔDWN1 . . . First decrease gradient having first constant value
ΔDWN2 . . . Second decrease gradient having second constant value
ΔUP1 . . . First increase gradient
ΔUP2 . . . Second increase gradient
ΔPmcTh . . . Specified depressurization amount

The invention claimed is:

1. A vehicle brake system comprising:
a regeneration brake device configured to apply regeneration braking force to a vehicle; and
a hydraulic brake device configured to adjust a fluid pressure in a wheel cylinder corresponding to a wheel to apply hydraulic braking force to the vehicle;
the vehicle brake system being configured to perform reallocation control of gradually decreasing the regeneration braking force and gradually increasing the hydraulic braking force in accordance with reduction in vehicle speed during brake operation of operating a brake operating member,
wherein the hydraulic brake device includes a fluid pressure generator comprising a master cylinder, the fluid pressure generator being configured to generate a basal fluid pressure in the master cylinder that corresponds to the brake operation, the hydraulic brake device also including a brake actuator configured to adjust a differential pressure between the master cylinder and the wheel cylinder,
the brake actuator includes a differential pressure control valve disposed at a channel between the master cylinder and the wheel cylinder, and a feed pump configured to draw brake fluid out of the master cylinder and discharge the brake fluid to a channel located closer to the wheel cylinder than the differential pressure control valve,
the fluid pressure generator includes a booster device configured to further assist an operation force of the brake operating member as the fluid pressure in a booster chamber is increased, and the fluid pressure generator is configured to adjust the basal fluid pressure by shifting a master piston in the master cylinder in accordance with the operation force assisted by the booster device and supply to the wheel cylinder an amount, corresponding to the basal fluid pressure, of the brake fluid,
the basal fluid pressure at a start timing of a keeping state, where an operation amount of the brake operating member is kept, is a reference basal fluid pressure,
the booster device includes a valve device configured to regulate inflow of fluid to the booster chamber if an amount of decrease of the basal fluid pressure from the reference basal fluid pressure is less than a specified amount of decrease even when the feed pump is actuated to decrease the brake fluid in the master cylinder in the keeping state, and
the brake system further comprises
a control device configured to make a decrease gradient of regeneration braking force in a first period, in which the amount of decrease of the basal fluid pressure from the reference basal fluid pressure is less than the specified amount of decrease, larger than a decrease gradient of regeneration braking force in a second period, in which the amount of decrease of the basal fluid pressure is not less than the specified amount of decrease, during the reallocation control in the keeping state.

2. The vehicle brake system according to claim 1, wherein
the reallocation control is configured to start if a vehicle body speed decreases to a reallocation start speed and end before the vehicle body speed reaches a reallocation end speed lower than the reallocation start speed,
the vehicle brake system further comprises a battery configured to store electric power generated when the regeneration brake device applies regeneration braking force to the vehicle,
the control device
is configured to perform, as the reallocation control, if a state of charge of the battery is less than a predetermined amount, first reallocation control of making the reallocation start speed lower than that of a case where the state of charge is not less than the predetermined amount and increasing the decrease gradient of the regeneration braking force in the first period as the state of charge is lower, and
is configured to perform, as the reallocation control, if the state of charge of the battery is not less than the predetermined amount, second reallocation control of setting the reallocation start speed to a fixed value, increasing the decrease gradient of the regeneration braking force in the first period as the state of charge is higher, and decreasing the decrease gradient of the regeneration braking force in the second period as the state of charge is higher.

3. The vehicle brake system according to claim 1, wherein
the reallocation control is configured to start if a vehicle body speed decreases to a reallocation start speed and end before the vehicle body speed reaches a reallocation end speed lower than the reallocation start speed, the vehicle brake system further comprises a battery configured to store electric power generated when the regeneration brake device applies regeneration braking force to the vehicle, the control device is configured to perform the reallocation control of: i) reducing the reallocation start speed and increasing the decrease gradient of the regeneration braking force in the first period as the state of charge of the battery is relatively lower; and ii) increasing the reallocation start speed and decreasing the decrease gradient of the regeneration braking force in the first period as the state of charge of the battery is relatively higher.

4. The vehicle brake system according to claim 1, wherein
the reallocation control is configured to start if a vehicle body speed decreases to a reallocation start speed and end before the vehicle body speed reaches a reallocation end speed lower than the reallocation start speed, the vehicle brake system further comprises a battery configured to store electric power generated when the regeneration brake device applies regeneration braking force to the vehicle, the control device performs the reallocation control of: i) setting the reallocation start speed to a fixed value, increasing the decrease gradient of the regeneration braking force in the first period and decreasing the decrease gradient of the regeneration braking force in the second period as the state of charge of the battery is relatively higher; and ii) setting the reallocation start speed to the fixed value, decreasing the decrease gradient of the regeneration braking force in the first period and increasing the decrease gradient of the regeneration braking force in the second period as the state of charge of the battery is relatively lower.

5. The vehicle brake system according to claim 1, wherein
the reallocation control is configured to start if a vehicle body speed decreases to a reallocation start speed and end before the vehicle body speed reaches a reallocation end speed lower than the reallocation start speed, the vehicle brake system further comprises a battery configured to store electric power generated when the regeneration brake device applies regeneration braking force to the vehicle, the control device performs the reallocation control by: i) increasing the reallocation start speed and decreasing the decrease gradient of the regeneration braking force in the second period as the state of charge of the battery is relatively higher; and ii) decreasing the reallocation start speed and increasing the decrease gradient of the regeneration braking force in the second period as the state of charge of the battery is relatively lower.

6. The vehicle brake system according to claim 1, wherein
the decrease gradient of the regeneration braking force in the first period has a first constant value and the decrease gradient of the regeneration braking force in the second period has a second constant value smaller than the first constant value.

* * * * *